United States Patent
Yamori

(10) Patent No.: US 8,553,764 B2
(45) Date of Patent: Oct. 8, 2013

(54) METHOD AND DEVICE FOR ENCODING MOVING PICTURE AND METHOD AND DEVICE FOR DECODING MOVING PICTURE

(75) Inventor: Akihiro Yamori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 13/038,491

(22) Filed: Mar. 2, 2011

(65) Prior Publication Data

US 2011/0228840 A1    Sep. 22, 2011

(30) Foreign Application Priority Data

Mar. 17, 2010 (JP) .................................. 2010-60855

(51) Int. Cl.
*H04N 7/26* (2006.01)

(52) U.S. Cl.
USPC ............ 375/240.03; 375/240.01; 375/240.02; 375/240.08; 375/240.12

(58) Field of Classification Search
USPC .................. 375/240–240.07, 240.12–240.16
See application file for complete search history.

(56) References Cited

U.S. PATENT DOCUMENTS

| 6,078,618 | A | * | 6/2000 | Yokoyama et al. | ........... 375/240 |
| 2007/0047649 | A1 | | 3/2007 | Suzuki et al. | |
| 2009/0041125 | A1 | * | 2/2009 | Ohgose | .................... 375/240.16 |

FOREIGN PATENT DOCUMENTS

| JP | 9-139948 A | 5/1997 |
| JP | 2007-067731 A | 3/2007 |
| JP | 2009-021864 A | 1/2009 |

* cited by examiner

*Primary Examiner* — Christopher S Kelley
*Assistant Examiner* — Jonathan Messmore
(74) *Attorney, Agent, or Firm* — Fujitsu Patent Center

(57) ABSTRACT

A device for encoding a picture included in moving picture data, through motion compensation, the device includes, a storage unit for storing a motion vector for motion compensation, the motion vector determined for each of a plurality of encoded pictures, a picture interval comparator for reading from the storage unit a first motion vector as a standard candidate vector, a co-located vector decider for calculating a co-located vector by setting the standard candidate vector to be the co-located vector of the first block, a direct motion vector calculator for calculating a first direct motion vector and a second direct motion vector with respect to the first block by dividing the co-located vector, a prediction image generator for generating a first motion compensation image, and an encoder for encoding an error signal representing a difference between the prediction image and a corresponding pixel on the first block.

20 Claims, 10 Drawing Sheets

METHOD AND DEVICE FOR ENCODING MOVING PICTURE AND METHOD AND DEVICE FOR DECODING MOVING PICTURE

CROSS-REFERENCE TO RELATED APPLICATION

This application is based upon and claims the benefit of priority of the prior Japanese Patent Application No. 2010-60855, filed on Mar. 17, 2010, the entire contents of which are incorporated herein by reference.

FIELD

The embodiments described herein relate to a method and apparatus for encoding an encoding target picture in accordance with information of another picture, and a method and apparatus for decoding an encoded moving picture.

BACKGROUND

Moving picture data has typically a large size. A device handling the moving picture data compresses the moving picture data through encoding if the device transmits the moving picture data to another device or stores the moving picture data onto a storage device. Widely used as typical encoding methods of a moving picture are moving picture experts group phase 2 (MPEG-2), MPEG-4, H.264 MPEG-4 advanced video coding (H.264 MPEG-4 AVC) standardized by the International Standardization Organization/International Electro technical Commission (ISO/IEC).

In such encoding methods, inter-encoding techniques are used. In the inter-encoding technique, a picture as an encoding target is encoded based on information related to the encoding target picture and pictures prior to and subsequent to the encoding target picture. In the inter-encoding technique, the encoding target picture is split into a plurality blocks. A region of a reference picture, which has been already decoded from encoded pictures prior to or subsequent to the target picture, and which is most similar to a block is selected through block matching in order to compensate for motion between pictures. A spatial travel distance between the most similar region and an encoding target block is thus calculated as a motion vector. The block on the reference picture most similar to the encoding target block is shifted to the same position of the encoding target block on the picture in order to generate a prediction image. The motion vector and difference information between the prediction image and the encoding target block are encoded. The inter-encoding technique removes redundant information and thus achieves a higher compression efficiency than the intra-encoding technique that encodes a picture using only information included in a single picture as an encoding target. Japanese Unexamined Patent Application Publication No. 9-139948 describes a technique that performs a motion compensation at a high accuracy level using a plurality of motion vectors calculated among an encoding target picture and a plurality of reference pictures. Japanese Unexamined Patent Application Publication No. 2009-21864 describes a technique that determines a search area on a reference picture as a block matching target depending on the degree of variations in the motion vector surrounding a target block.

The motion vector is produced on a per block basis. A plurality of motion vectors are generated for each block in a bi-directional prediction picture in which a prediction image is generated based on at least two reference pictures. An amount of information for encoding the motion vector is to be reduced in order to enhance further the compression efficiency. In H.264 MPEG-4 AVC, a temporal direct mode is used as one of the inter-encoding techniques in order to reduce an encoding amount related to a motion vector of a bi-directional prediction picture. In the temporal direct mode, a motion vector of a block on an already encoded reference picture P1 at the same position as the position of an encoding target block of a bi-directional prediction picture is determined as a co-located vector that determines the motion vector of the encoding target block. The motion vector of the encoding target block is calculated by adjusting the co-located vector in accordance with a ratio (t1/t2) of a time interval t1 to a time interval t2. The time interval t1 is between a picture including the encoding target block and the reference picture P1, and the time interval t2 is between a picture as a reference source of the co-located vector and a picture as a reference destination of the co-located vector. Since the co-located vector is encoded, the moving picture encoding apparatus is free from including in the encoded moving picture data the motion vector of the bi-directional prediction picture. The moving picture encoding apparatus working in the temporal direct mode provides an even higher compression efficiency.

There is a possibility that a block on a reference picture at the same position as the position of an encoding target block on an encoding target picture includes an image that moves in a fashion different from an image included in the encoding target block. In such a case, if a motion vector of the block on the reference picture having the same position as the position of the encoding target block is the co-located vector, a variation in corresponding pixels between the encoding target block and the prediction image may increase, and the encoding efficiency may decrease. Japanese Laid-open Patent Publication No. 2007-67731 describes a technique that calculates the co-located vector based on a motion vector passing through the encoding target block from among the motion vectors determined for blocks of the reference picture.

SUMMARY

In accordance with an aspect of the embodiments, a device for encoding a picture included in moving picture data, through motion compensation, the device includes, a storage unit for storing a motion vector for motion compensation, the motion vector determined for each of a plurality of encoded pictures included in the moving picture data; a picture interval comparator for reading from the storage unit a first motion vector as a standard candidate vector, the first motion vector having a first reference block as a reference source, the first reference block being present at a position corresponding to a first block of a plurality of blocks, the plurality of blocks split from an encoding target picture included in the moving picture data, on a first reference picture of the encoded pictures included in the moving picture data, and determining whether a first time interval is longer than a second time interval, the first time interval between a second reference picture including a second reference block as a reference destination of the standard candidate vector or the first reference picture and the encoding target picture and the second time interval between the first reference picture and the second reference picture; a co-located vector decider for calculating a co-located vector by setting the standard candidate vector to be the co-located vector of the first block, by setting the first reference picture to be a reference source picture of the co-located vector, and by setting the second reference picture to be a reference destination picture of the co-located vector if the first time interval is shorter than the second time interval, and for calculating a co-located vector by reading from the storage unit a second motion vector having the second reference block as a reference source, by setting a third reference picture including a block of a reference destination of the second motion vector to be the reference destination picture of the co-located vector and by setting the first reference picture to be the reference source picture of the co-located vector if the first time interval is longer than the second time interval; a direct motion vector calculator for calculating a first direct motion vector and a second direct motion vector with respect to the first block by dividing the co-located vector in accordance with a ratio of a time interval between the reference destination picture and the reference source picture to a time interval between the reference destination picture and the encoding target picture; a prediction image generator for generating a first motion compensation image by motion-compensating for the reference destination picture in accordance with the first direct motion vector, generating a second motion compensation image by motion-compensating for the reference source picture in accordance with the second direct motion vector, and generating a prediction image of the first block in accordance with the first motion compensation image and the second motion compensation image; and an encoder for encoding an error signal representing a difference between the prediction image and a corresponding pixel on the first block.

The object and advantages of the invention will be realized and attained by at least the features, elements, and combinations particularly pointed out in the claims. It is to be understood that both the foregoing general description and the following detailed description are exemplary and explanatory and are not restrictive of the various embodiments, as claimed.

BRIEF DESCRIPTION OF DRAWINGS

These and/or other aspects and advantages will become apparent and more readily appreciated from the following description of the embodiments, taken in conjunction with the accompanying drawings.

DESCRIPTION OF EMBODIMENTS

Figure 1:
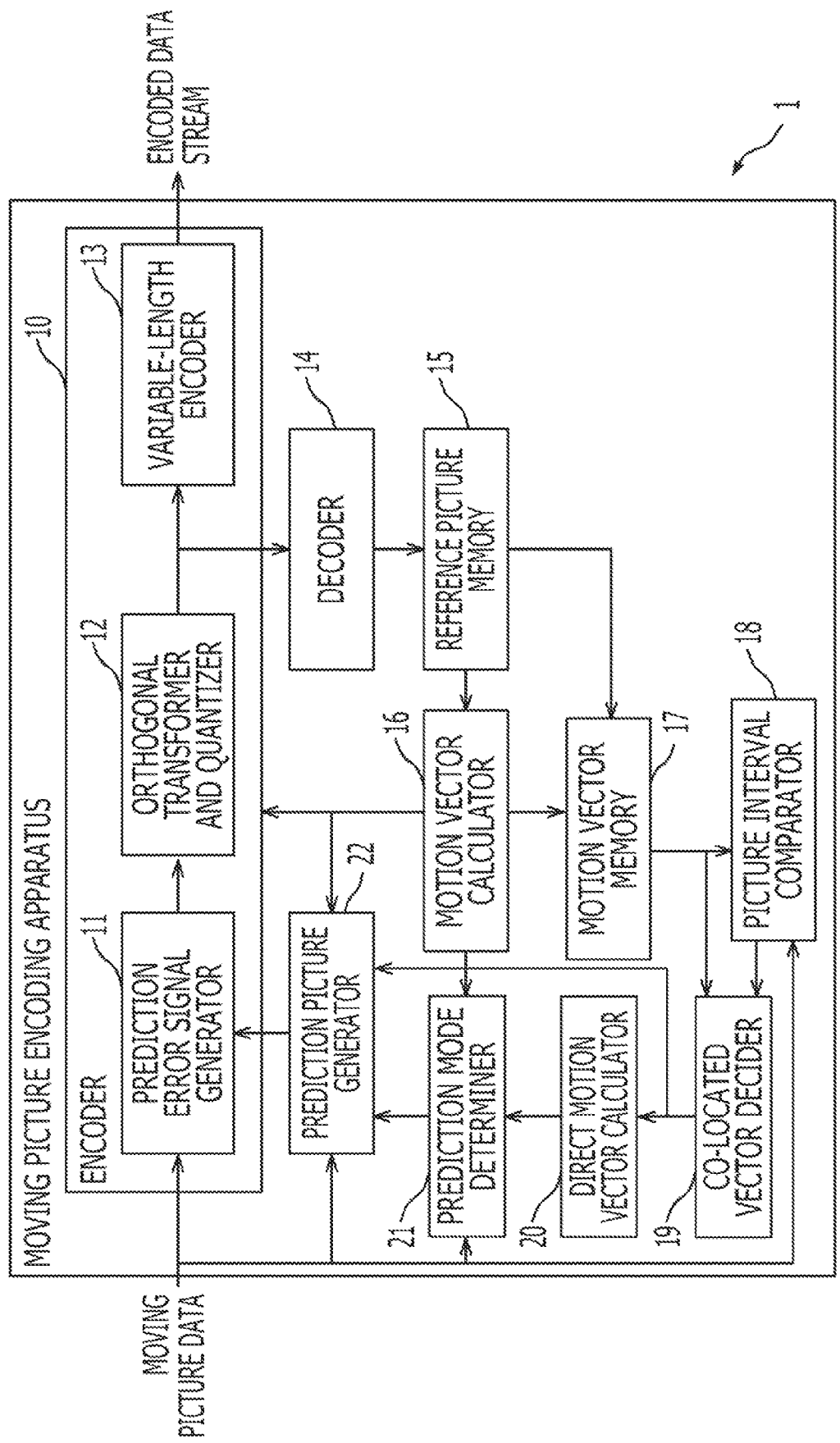
FIG. 1 illustrates a basic configuration of a moving picture encoding apparatus of one embodiment.

A moving picture encoding apparatus of one embodiment is described below.

Described below are findings studied by the inventor about the moving picture encoding apparatus. According to H.264 MPEG-4 AVC, a plurality of encoded pictures are used as a reference picture with respect to a picture to be inter-encoded. A block on a reference picture P1 at the same position as the position of a block of interest on an encoding target picture in a temporal direct mode refers to a past reference picture P2 for motion compensation, and both the reference picture P1 and the past reference picture P2 may be later in time than the encoding target picture. In such a case, a time interval t2 between the reference picture P1 and the past reference picture P2 may be shorter than a time interval t1 between the encoding target picture and the reference picture P1. In such a case, a ratio t1/t2 is higher than 1, and the length of a motion vector of an encoding target block in time axis is longer than the length of a co-located vector in time axis. As a result, the motion compensation of the motion vector in the encoding target block becomes coarse in resolution. The prediction accuracy of the prediction image decreases with respect to the encoding target block. A difference between the prediction image and the encoding target block increases, thereby lowering the encoding efficiency.

A motion vector of a block of interest of an encoding target picture as a bi-directional prediction picture is determined in the temporal direct mode. The moving picture encoding apparatus sets as a standard candidate vector a motion vector of a reference block on a reference picture at the same position as a position of the block of interest. The moving picture encoding apparatus detects a past reference picture that includes a reference destination block of the standard candidate vector. If a time interval between the reference picture and the past reference picture is shorter than a time interval between the encoding target picture and the reference picture or the past reference picture, the moving picture encoding apparatus determines a motion vector of a second reference block on a past reference picture which the reference block refers to. The moving picture encoding apparatus sums the motion vector of the first reference block and the motion vector of the second reference block, thereby determining the co-located vector of the block of interest. The moving picture encoding apparatus increases the motion compensation accuracy of the motion vector in the temporal direct mode by setting the time interval between the pictures of a reference source and a reference destination of the co-located vector to be longer than the time interval between the encoding target picture and the picture of the reference destination of the co-located vector.

The pictures may be frames or fields. The frame is a single still image of the moving picture data while the field is a still image that is picked up on every odd-numbered line or every even-numbered line from the moving picture data.

The moving picture data is encoded by group of pictures (GOP). The GOP includes a plurality of consecutive pictures, and has a structure in which an encoding method to each picture is defined. In the discussion that follows, a P picture refers to a picture that is to be inter-encoded based on information of a single page of previously encoded picture from among the pictures included in the GOP. A B picture refers to a picture that is to be inter-encoded based on information of two pages of previously encoded picture. One page of the previously encoded picture as a reference of the B picture may be earlier in time than the B picture, and the other page of the previously encoded picture may be later in time than the B picture. Alternatively, the two pages of the previously encoded picture may be earlier in time than the B picture. Also, alternatively, the two pages of the previously encoded picture may be later in time than the B picture.

A picture that is a target of intra-encoding and is not to be inter-encoded is referred to as an I picture.

FIG. 1 illustrates a basic configuration of a moving picture encoding apparatus 1 of one embodiment. The moving picture encoding apparatus 1 includes encoder 10, decoder 14, reference image memory 15, motion vector calculator 16, motion vector memory 17, picture interval comparator 18, co-located vector decider 19, direct motion vector calculator 20, prediction mode determiner 21, and prediction image generator 22.

These elements of the moving picture encoding apparatus 1 may be arranged as respective separate circuits. Alternatively, these elements may be arranged as a single integrated circuit into the moving picture encoding apparatus 1. Furthermore, these elements of the moving picture encoding apparatus 1 may be a functional module that is executed by a computer program running on a processor in the moving picture encoding apparatus 1.

A controller (not illustrated) generally controlling the moving picture encoding apparatus 1 splits a picture as an encoding target into a plurality of blocks, each having a specific number of pixels. The block serving as a unit of an encoding process is hereinafter referred to as a macro block. The macro blocks are input to the moving picture encoding apparatus 1 in an order defined in H.264 MPEG-4 AVC standard.

For example, each macro block includes a matrix of 16 rows by 16 columns of pixels or a matrix of 8 rows and 8 columns of pixels.

The encoder 10 encodes a present picture as an encoding target out of the moving picture data. The encoder 10 thus includes prediction error signal generator 11, orthogonal transformer and quantizer 12, and variable-length encoder 13.

The prediction error signal generator 11 performs a difference calculation process to calculate a difference between an input macro block and a prediction image generated by the co-located vector decider 19. The orthogonal transformer and quantizer 12 sets as a prediction error signal a difference value for each pixel in the macro block obtained through the difference calculation process.

The prediction error signal generator 11 transfers the prediction error signal to the orthogonal transformer and quantizer 12.

The orthogonal transformer and quantizer 12 orthogonal-transforms the prediction error signal of the input macro block, thereby determining a frequency signal representing a frequency component of the prediction error signal in the horizontal direction and a frequency component of the prediction error signal in the vertical direction. For example, the orthogonal transformer and quantizer 12 performs discrete cosine transform (DCT) on the prediction error signal an orthogonal transform process, thereby resulting in a set of DCT coefficients as the frequency signal on a per macro block basis.

The orthogonal transformer and quantizer 12 then quantizes the frequency signal. In the quantization process, signal values throughout a constant segment are represented by a single signal value. The constant segment is referred to as a quantization width. The orthogonal transformer and quantizer 12 truncates lower bits of a specific constant corresponding to the quantization width, thereby quantizing the frequency signal. The quantization width is determined by a quantization parameter. For example, the orthogonal transformer and quantizer 12 determines the quantization width in use in accordance with a function that represents a value of the quantization width in response to a value of the quantization parameter. The function may be a function monotonically increasing in response to the value of the quantization parameter and may be preset. Alternatively, a quantization matrix may define the quantization width to each of the frequency components in the horizontal direction and in the vertical direction and a plurality of quantization matrices may be prepared and stored on a memory of the orthogonal transformer and quantizer 12. The orthogonal transformer and quantizer 12 selects a particular quantization matrix in response to the quantization parameter. The orthogonal transformer and quantizer 12 may reference the selected quantization matrix, and determine the quantization width responsive to each frequency component of the frequency signal.

The orthogonal transformer and quantizer 12 may also determine the quantization parameter in accordance with any of a variety of quantization parameter decision methods meeting one of the moving picture encoding standards including MPEG-2, MPEG-4, and H.264 MPEG-4 AVC. The orthogonal transformer and quantizer 12 employs the calculation method of the quantization parameter related to the standard Test Model 5 of MPEG-2. The orthogonal transformer and quantizer 12 performs an quantization process, thereby reducing the number of bits used to represent each frequency component of the frequency signal. The orthogonal transformer and quantizer 12 thus reduces an amount of information contained in the input macro block. The orthogonal transformer and quantizer 12 supplies the quantization signal to each the variable-length encoder 13 and the decoder 14.

The variable-length encoder 13 encodes the quantization signal received from the orthogonal transformer and quantizer 12 and a motion vector received from the motion vector calculator 16. The variable-length encoder 13 thus generates an encoded signal having an amount of data reduced through compression. The variable-length encoder 13 performs a variable-length encoding process to the quantization signal. Through the variable-length encoding process, the higher the probability of occurrence of a signal value, the shorter the variable-length code word is assigned thereto. For example, the variable-length encoder 13 may employ a Huffman coding process or an arithmetic coding process as the variable-length encoding process.

The moving picture encoding apparatus 1 generates a data stream including the encoded moving picture data by adding, to the encoded signal generated by the variable-length encoder 13, specific information including a prediction mode on a per macro block as header information. The moving picture encoding apparatus 1 may supply the data stream to a storage unit (not illustrated) including a magnetic recording medium, an optical recording medium, or a semiconductor memory, or may supply the data stream to another device.

The decoder 14 dequantizes the quantization signal received from the orthogonal transformer and quantizer 12, by multiplying the quantization signal by a specific value corresponding to the quantization width determined by the quantization parameter. Through the dequantization process, the frequency signal of the input macro block, such as a set of DCT coefficients, is restored. The decoder 14 then performs an inverse orthogonal transform process on the frequency signal. If the orthogonal transformer and quantizer 12 performs a DCT process, the decoder 14 performs inverse DCT process on a dequantization signal. The dequantization process and the inverse orthogonal transform process, if performed on the quantization signal, reproduces a prediction error signal having the same level of information as that of a prediction error signal prior to encoding.

On a picture to be inter-encoded, the decoder 14 adds, to the value of each pixel of the prediction image generated through motion compensation on the reference image, the prediction error signal reproduced for the pixel. On a picture to be intra-encoded, the decoder 14 adds, to the value of each pixel of the prediction image generated based on the macro block previously encoded, the prediction error signal reproduced for the pixel. By executing these processes on each macro block, the decoder 14 generates a reference image that is to be used to generate a prediction image of the macro block to be encoded thereafter.

The decoder 14 causes the reference image memory 15 to store the obtained reference signal.

The reference image memory 15 includes a frame memory. The reference image memory 15 temporarily stores the reference image received from the decoder 14. The reference image memory 15 then supplies the reference image to each of the motion vector calculator 16, the prediction mode determiner 21, and the prediction image generator 22. The reference image memory 15 stores a specific number of pages of reference image, and if the number of pages exceeds the specific number, the reference images are destroyed in the order from old to new.

The motion vector calculator 16 calculates the motion vector based on the input macro block and the reference image in order to generate the prediction image for inter-encoding. The motion vector represents a spatial travel distance between the input macro block and the reference image most similar to the macro block.

The motion vector calculator 16 performs a block-matching process on the input macro block and the reference image. The motion vector calculator 16 thus determines the reference image most matching the input macro block and a position the input macro block on a picture including the reference image.

The motion vector calculator 16 calculates the motion vector. The motion vector contains, as elements thereof, travel distances in the horizontal direction and in the vertical direction between the position of the input macro block on the picture and the reference image most matching the macro block, and identification information representing the picture to which the reference image belongs.

The motion vector calculator 16 thus transfers the determined motion vector to each of the motion vector memory 17, the prediction mode determiner 21, the prediction image generator 22, and the encoder 10.

The motion vector memory 17 temporarily stores the motion vector determined by the motion vector calculator 16 in order to determine the co-located vector in the temporal direct mode. The motion vector memory 17 stores the motion vectors of the macro blocks of several pages of picture in the order of encoding during a time duration throughout which there is a possibility that the motion vector determined for each macro block may be used to calculate the co-located vector. The motion vector memory 17 transfers the stored motion vector to each of the picture interval comparator 18 and the co-located vector decider 19.

The picture interval comparator 18, the co-located vector decider 19, and the direct motion vector calculator 20 determine the co-located vector and the motion vector if the temporal direct mode is used as a prediction mode. Described below is the determination method of the moving picture encoding apparatus 1 of determining the co-located vector and the motion vector.

Figure 2:
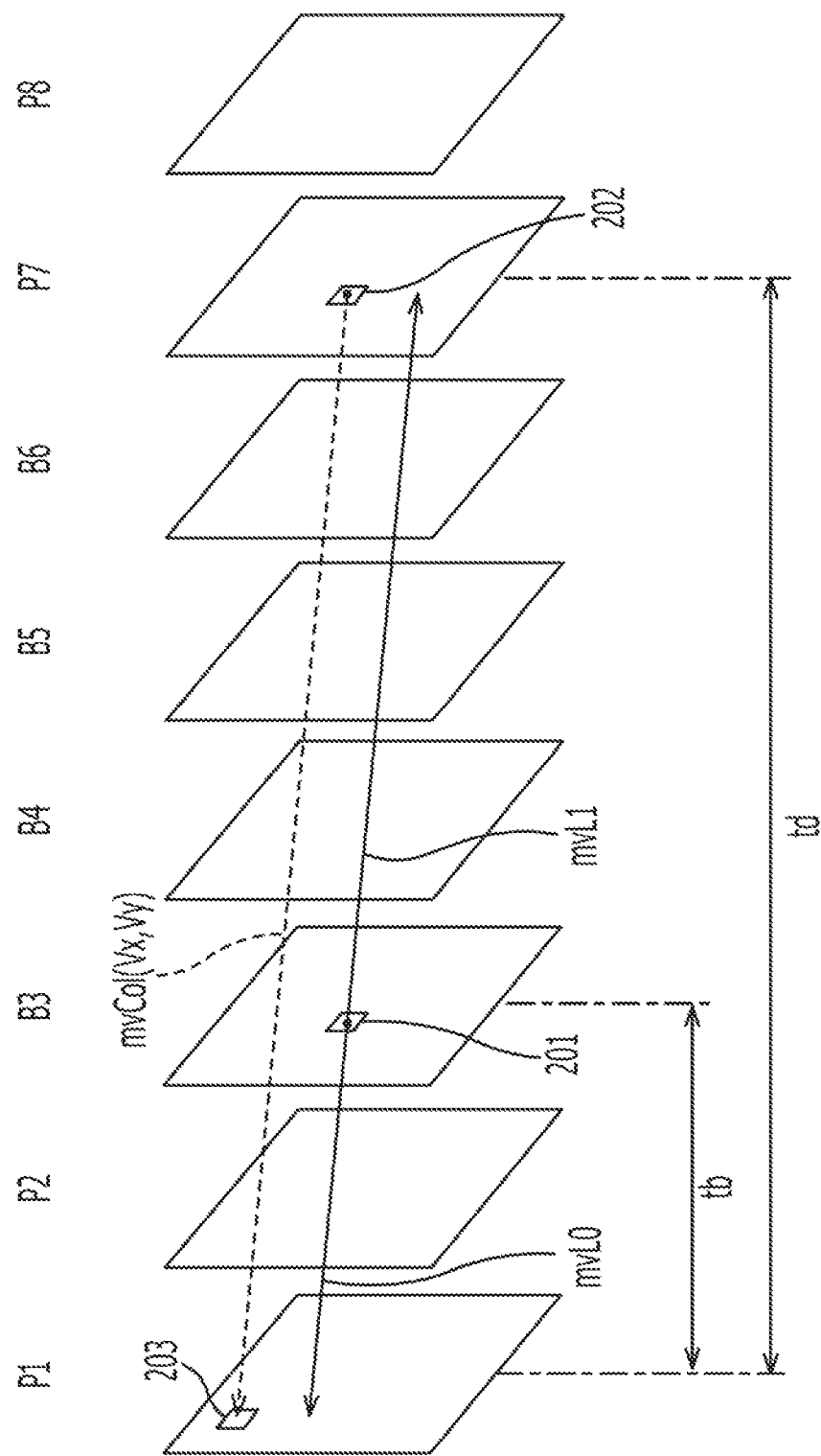
FIG. 2 illustrates a relationship held between a co-located vector and motion vectors when a time interval between an encoding target picture and a reference picture is shorter than a time interval between the reference picture and a past reference picture in a temporal direct mode.

FIG. 2 illustrates the co-located vector and the motion vectors in the temporal direct mode when the time interval between the encoding target picture and the reference picture is shorter than the time interval between the reference picture and the past reference picture. Referring to FIG. 2, pictures P1-P8 are arranged from left to right in the order of time elapsing, and respectively represent fields. Pictures P1, B3, B5, and P7 are top fields including odd-numbered line data of the original frames. Pictures P2, B4, B6, and P8 are bottom fields including even-numbered line data of the original frames. Pictures P1 and P2 are within the same frame, and are fields different in parity. Similarly, pictures B3 and B4, pictures B5 and B6, and pictures P7 and P8 are respectively within the same frames and are fields different in parity.

Pictures P1, P2, P7, and P8 are P pictures while pictures B3-B6 are B pictures. The GOP of the pictures P1-P8 is so-called IBBP. The pictures P1, P2, P7, P8, B3, B4, B5, and B6 are to be encoded in that order. Picture B3 as a B picture is an encoding target picture, and block 201 is a block of interest. The encoding of pictures P1, P2, P7, and P8 is complete at this point of time.

In this case, the reference picture is picture P7 that is encoded immediately prior to picture B3 and of the same parity as that of picture B3. Block 202 on the reference picture at the same position as the position of block 201 of interest is a reference block. A motion vector determined for block 202 serves a co-located vector mvCol(Vx,Vy) of block 201. Picture P1 including block 203 as a reference destination of the co-located vector mvCol(Vx,Vy) serves as a past reference picture. Vx and Vy respectively represent position differences in the horizontal direction and in the vertical direction between block 203 and block 202. In this case, two motion vectors mvL0 and mvL1 of block 201 are calculated from equations (1):

$$mvL0 = (tb/td * Vx, tb/td * Vy)$$

$$mvL1 = mvL0 - mvCol \quad (1)$$

where mvL0 represents a motion vector with the past reference picture P1 being a reference picture, mvL1 represents a motion vector with the reference picture P7 being a reference picture, tb represents the time interval between the encoding target picture B3 and the past reference picture P1 and td represent the time interval between the reference picture P7 and the past reference picture P1.

Referring to FIG. 2, the time interval td is longer than the time interval tb. A motion prediction error contained in the co-located vector mvCol(Vx,Vy) decreases in response to a ratio of tb/td. If an image on block 201 and an image on block 202 move at the same rate in the same direction, the motion vector calculated from the co-located vector mvCol(Vx,Vy) has a high motion prediction accuracy.

Figure 3:
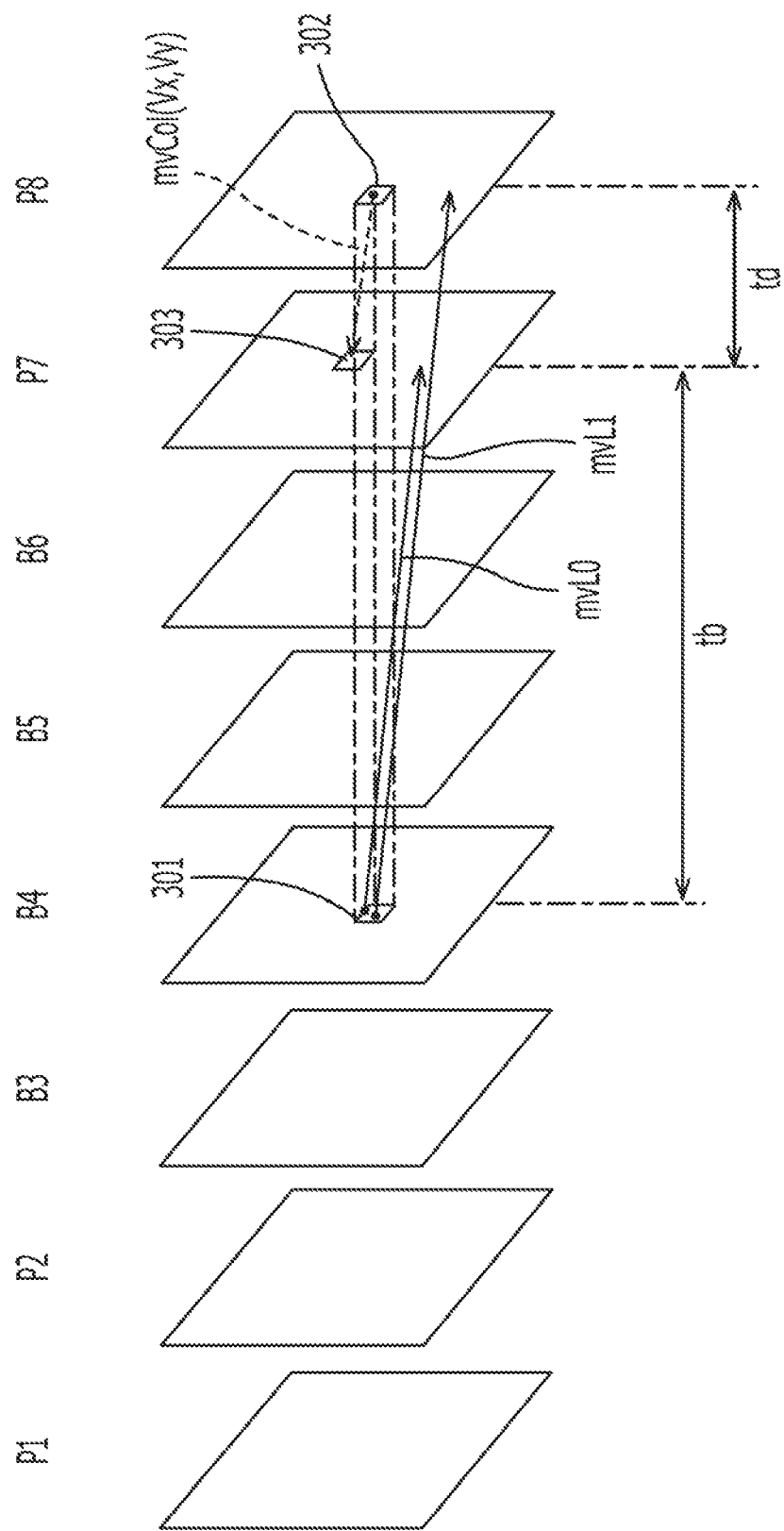
FIG. 3 illustrates a relationship held between the co-located vector and the motion vectors in related art when the time interval between the encoding target picture and the reference picture is longer than the time interval between the reference picture and the past reference picture in the temporal direct mode.

FIG. 3 illustrates the co-located vector and the motion vectors in related art when the time interval between the encoding target picture and the reference picture is longer than the time interval between the reference picture and the past reference picture in the temporal direct mode. Referring to FIG. 3, pictures P1-P8 respectively represent fields. The picture types and the encoding order of pictures P1-P8 illustrated in FIG. 3 are respectively identical to the picture types and the encoding order of pictures P1-P8 illustrated in FIG. 2. Referring to FIG. 3, picture B4 as a B picture is an encoding target picture and block 301 on picture B4 is a block of interest. The encoding of pictures P1, P2, P7, and P8 is complete.

As illustrated in FIG. 3, picture P8 having the same parity as the parity of picture B4 is a reference picture in the frame encoded immediately prior to picture B4, and block 302 on the reference picture at the same position as the position of block 301 of interest is a reference block. A motion vector determined for block 302 is a co-located vector mvCol(Vx, Vy) of block 301. Picture P7 including block 303 as a reference destination of the co-located vector mvCol(Vx,Vy) is a past reference picture. In this case, as well, two motion vectors mvL0 and mvL1 of block 301 are calculated in accordance with equations (1). In FIG. 3, the time interval td is shorter than the time interval tb. A motion prediction error contained in the co-located vector mvCol(Vx,Vy) increases in response to the ratio of tb/td. Since the time interval tb is three times as long as the time interval td, the motion prediction errors contained in mvL0 and mvL1 are three times and four times the motion prediction errors contained in the co-located vector, respectively. Even if the image on block 301 and the image on block 302 move at the same rate in the same direction, the motion prediction accuracy having the motion vector calculated from the co-located vector mvCol(Vx,Vy) may be reduced.

A moving picture encoding apparatus complying with H.264 MPEG-4 AVC may perform the motion compensation by ¼ pixel. If the ratio tb/td is high, the travel distances of the motion vector calculated in the temporal direct mode in the horizontal direction and in the vertical direction are determined by multiplying the travel distances of the co-located vector in the horizontal direction and in the vertical direction by coefficients larger than 1 in accordance with equations (1). The moving picture encoding apparatus of related art performs the motion compensation, only by unit larger than a minimum unit of travel distance in moving picture compensation.

Figure 4:
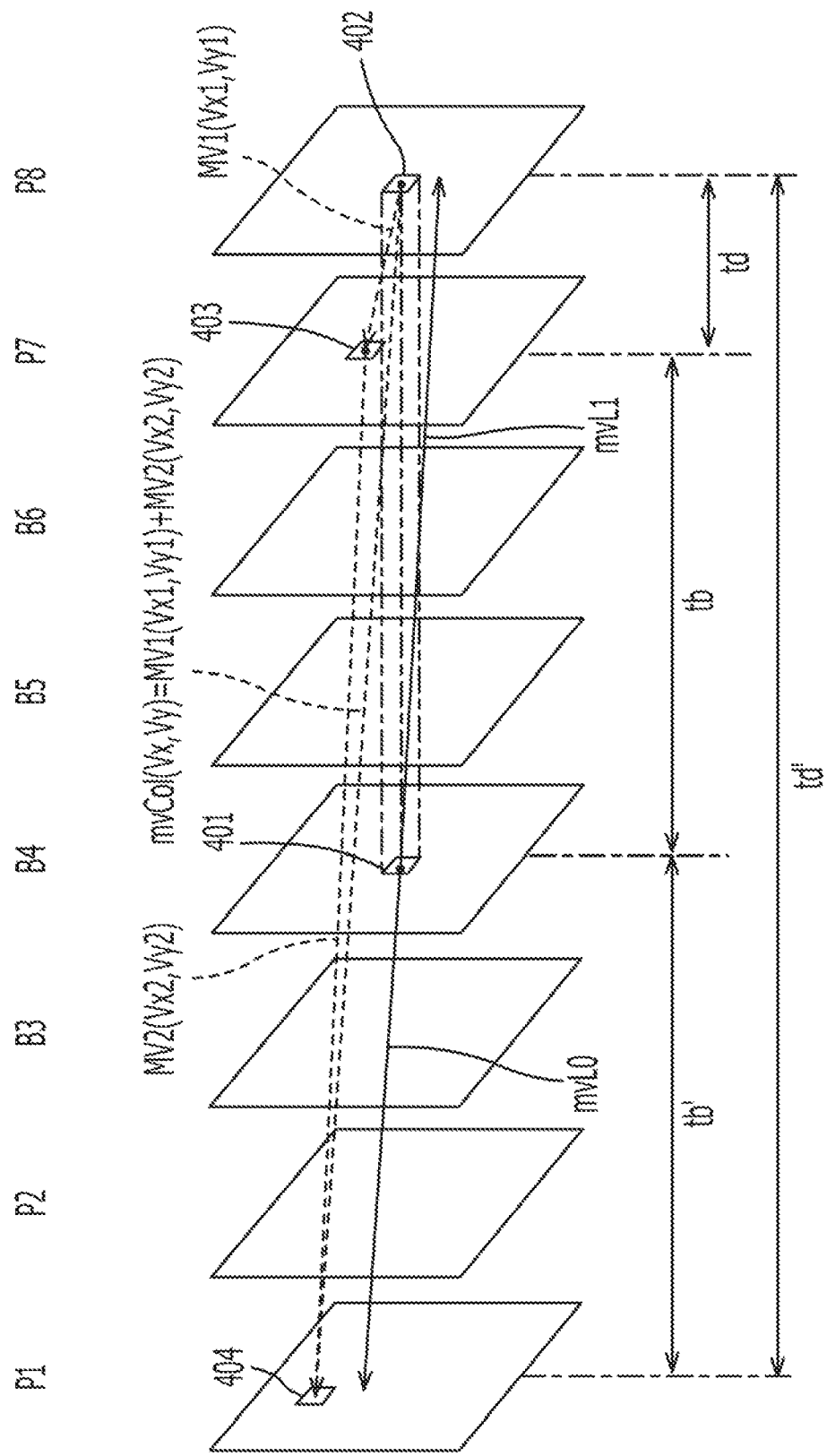
FIG. 4 illustrates the co-located vector and the motion vectors in one embodiment when the time interval between the encoding target picture and the reference picture is longer than the time interval between the reference picture and the past reference picture in the temporal direct mode.

FIG. 4 illustrates the co-located vector and the motion vectors in one embodiment when the time interval between the encoding target picture and the reference picture is longer than the time interval between the reference picture and the past reference picture in the temporal direct mode. Referring to FIG. 4, pictures P1-P8 respectively represent fields. The picture types and the encoding order of pictures P1-P8 illustrated in FIG. 4 are respectively identical to the picture types and the encoding order of pictures P1-P8 illustrated in FIG. 2.

Referring to FIG. 4, picture B4 as a B picture is an encoding target picture and block 401 on picture B4 is a block of interest. The encoding of pictures P1, P2, P7, and P8 is complete.

As illustrated in FIG. 4, picture P8 having the same parity as the parity of picture B4 is a reference picture in the frame encoded immediately prior to picture B4, and block 402 on the reference picture at the same position as the position of block 401 of interest is a reference block. The moving picture encoding apparatus 1 references a motion vector MV1(Vx1, Vy1) of reference block 402 to determine the co-located vector of block 401. The motion vector MV1(Vx1,Vy1) refers to block 403 on picture P7 included in the same frame as picture P8. Picture P7 is thus a past reference picture. Vx1 and Vy1 respectively represent position differences in the horizontal direction and in the vertical direction between block 403 and block 402.

The time interval tb between the encoding target picture B4 and the past reference picture P7 is longer than the time interval td between the reference picture P8 and the past reference picture P7. In one embodiment, the co-located vector may be a motion vector between two pictures having a time interval therebetween longer than the time interval tb. By determining the co-located vector in this way, the motion prediction error contained in the co-located vector is prevented from being increased in response to the ratio of tb to td.

Since block 402 refers to block 403, it is likely that block 402 and block 403 bear the same image. If the reference destination of a motion vector MV2(Vx2,Vy2) determined for block 403 is block 404 included in picture P1 as illustrated in FIG. 4, it is also likely that block 403 and block 404 bear the same image. It is also likely that block 402 and block 404 bear the same image. Vx2 and Vy2 respectively represent position differences in the horizontal direction and in the vertical direction between block 404 and block 403. The moving picture encoding apparatus 1 of the embodiment calculates the co-located vector mvCol(Vx,Vy) by adding the motion vector MV2(Vx2,Vy2) determined for block 403 to the motion vector MV1(Vx1,Vy1) determined for block 402.

The co-located vector is thus calculated, and the time interval td' between the reference picture P8 serving as a reference source of the co-located vector and the picture P1 serving a reference destination of the co-located vector becomes longer than the time interval tb' between the picture B4 and the picture P1. If the image on block 401 and the images on blocks 402 and 404 move at the same rate and in the same direction, the motion prediction accuracy level of the motion vector calculated from the co-located vector mvCol remains high.

According to the embodiment, the two motion vectors mvL0 and mvL1 of block 401 are determined in accordance with equations (1). The time interval tb' is a time interval between the picture P1 including block 404 as the reference destination of the co-located vector and the encoding target picture B4. The time interval td' is a time interval between the picture P1 including block 404 serving as the reference destination of the co-located vector and the picture P8 including block 402 serving as the reference source of the co-located vector. The motion vector mvL0 represents a motion vector directed to the picture P1 and the motion vector mvL1 is a motion vector directed to the picture P8.

The picture interval comparator 18 identifies as a reference block a macro block which is on the reference picture encoded immediately prior to the encoding target picture and which is at a position corresponding to the input macro block. The picture interval comparator 18 reads as a standard candidate vector the motion vector determined for the reference block from the motion vector memory 17.

The reference block may be a block at the same position as the position of the input macro block on the reference picture. Alternatively, the reference block may be a block that serves as the reference source of the co-located vector in which the input macro block is present in the extension line of the co-located vector. The picture interval comparator 18 compares the time interval td between the reference picture including the reference block and the past reference picture as the reference destination of the standard candidate vector with the time interval tb between the encoding target picture and the past reference picture. The picture interval comparator 18 then notifies the co-located vector decider 19 of the comparison determination results as to whether the time interval tb is longer than the time interval td. In one embodiment, the picture interval comparator 18 may notify the co-located vector decider 19 of the comparison determination results as to whether the time interval tb2 between the encoding target picture and the reference picture is longer than the time interval td. In another embodiment, the picture interval comparator 18 may notify the co-located vector decider 19 of the comparison determination results as to whether the time interval tb is longer than the time interval td and the comparison determination results as to whether the time interval tb2 is longer than the time interval td.

If pictures included in the moving picture data are fields, the reference picture and the past reference picture may be included in the same frame and may be opposite-parity fields. In such a case, the reference picture and the past reference picture are consecutive in time, and the time interval between the reference picture and the past reference picture is shorter than the time interval between the encoding target picture and the reference picture. If the reference picture and the past reference picture are fields included in the same frame, the picture interval comparator 18 may determine that the time interval tb2 between the encoding target picture and the reference picture is longer than the time interval td.

The co-located vector decider 19 decides the co-located vector for the input macro block. The co-located vector decider 19 then selects a production method of the co-located vector in response to the comparison determination results of the time interval tb or tb2 and the time interval td, which the picture interval comparator 18 has notified the co-located vector decider 19 of.

More specifically, if the time interval td is longer than the time interval tb or tb2, the co-located vector decider 19 decides the co-located vector in the same manner as in the temporal direct mode of related art. In other words, the co-located vector decider 19 sets as the co-located vector the motion vector of the macro block, at the same position as the position of the input macro block, on the reference picture encoded immediately prior to the encoding target picture including the input macro block. If the picture interval comparator 18 notifies the co-located vector decider 19 of only the comparison results of the time intervals tb and td, and if the time interval td is longer than time interval tb, the co-located vector decider 19 decides the co-located vector in the same manner as in the temporal direct mode of related art. If the picture interval comparator 18 notifies the co-located vector decider 19 of only the comparison results of the intervals tb2 and td, and if the time interval td is longer than time interval tb2, the co-located vector decider 19 decides the co-located vector in the same manner as in the temporal direct mode of related art.

If the time interval td is shorter than the time interval tb or tb2 on the other hand, the co-located vector decider 19 decides the co-located vector as described with referent to FIG. 4. To this end, the co-located vector decider 19 reads from the motion vector memory 17 the motion vector MV1(Vx1,Vy1) having as a reference source the reference block on the reference picture at the position corresponding to the input macro block. The co-located vector decider 19 reads from the motion vector memory 17 the motion vector MV2(Vx2,Vy2) having as a reference source a macro block on the past reference picture serving as a reference destination of the motion vector MV1(Vx1,Vy1). The co-located vector decider 19 decides the co-located vector mvCol(Vx,Vy) in accordance with equation (2):

$$mvCol(Vx,Vy)=MV1(Vx1,Vx2)+MV2(Vx2,Vy2) \quad (2)$$

The reference block may be a block, at the same position as the position of the input macro block, on the reference picture as described above, or may be a block that serves as the reference source of the co-located vector in which the input macro block is present in the extension line of the co-located vector.

The co-located vector decider 19 transfers to the direct motion vector calculator 20 the co-located vector mvCol(Vx, Vy), a standard source picture number identifying a picture of the reference source of the co-located vector, and a reference destination number identifying a picture of the reference destination of the co-located vector. The standard source picture number identifies the reference picture. The standard destination picture number identifies the past reference picture if the ratio tb/td or tb2/td is less than 1, and represents a picture of the reference destination of the motion vector MV2(Vx2, Vy2) if the ratio tb/td or tb2/td is larger than 1.

In response to the standard destination picture number, the direct motion vector calculator 20 calculates the time interval tb between the picture indicated by the standard destination picture number and the encoding target picture including the input macro block. The direct motion vector calculator 20 also calculates the time interval td between the picture of the reference destination of the co-located vector and the picture of the reference source of the co-located vector in response to the standard destination picture number and the standard source picture number. The direct motion vector calculator 20 calculates the two motion vectors mvL0 and mvL1 with the input macro block being the reference source by substituting the co-located vector and the time intervals tb and td for those in equations (1). More specifically, the direct motion vector calculator 20 divides the co-located vector by a ratio of the time interval tb to the time interval td to calculate the two motion vectors mvL0 and mvL1. The time interval tb is a time interval between the encoding target picture and the reference destination picture, and the time interval td is a time interval between the picture of the reference destination of the co-located vector and the picture of the reference source of the co-located vector. The direct motion vector calculator 20 maps the two motion vectors mvL0 and mvL1 respectively to the standard source picture number and the standard destination picture number as numbers representing the pictures as the reference destinations of the motion vectors.

The direct motion vector calculator 20 transfers the calculated two motion vectors mvL0 and mvL1 to the prediction mode determiner 21.

The prediction mode determiner 21 determines the prediction mode defining the production method of the prediction image to the input macro block. For example, the prediction mode determiner 21 determines the prediction mode of the macro block based on information acquired from a controller (not illustrated) and indicating a type of an encoding target picture including the input macro block. If the type of the encoding target picture is an I picture, the prediction mode determiner 21 selects the intra-encoding mode as an applicable prediction mode.

If the type of the encoding target picture is a P picture, the prediction mode determiner 21 selects one of the inter-encoding mode and the intra-encoding mode as an applicable prediction mode. Whether the inter-encoding mode is a forward prediction mode referring to a prior picture or a backward prediction mode referring to a subsequent picture may be determined based on information indicating a position of an encoding target picture within the GOP. If the encoding target picture is a B picture, the prediction mode determiner 21 selects as an applicable prediction mode one mode from the intra-encoding mode, the forward prediction mode, the backward prediction mode, the bi-directional prediction mode, and the temporal direct mode.

If one prediction mode is selected from a plurality of prediction modes, the prediction mode determiner 21 calculates costs as evaluation values of sizes of encoded data of the macro blocks in the prediction modes. The prediction mode determiner 21 sets as an applicable prediction mode to the input macro block a prediction mode of a minimum cost.

The costs of the modes are calculated in accordance with equations (3):

$$\mathrm{cos}td = \sum_{i,j} |org_{i,j} - ref_{i,j}| \quad (3)$$

$$\mathrm{cos}tf = \sum_{i,j} |org_{i,j} - ref_{i,j}| + \lambda * (\text{Table}[mv1 - premv1])$$

$$\mathrm{cos}tb = \sum_{i,j} |org_{i,j} - ref_{i,j}| + \lambda * (\text{Table}[mv1 - premv1])$$

$$\mathrm{cos}tbi = \sum_{i,j} |org_{i,j} - ref_{i,j}| +$$

$$\lambda * (\text{Table}[mv1 - premv1] + \text{Table}[mv2 - premv2])$$

$$\mathrm{cos}ti = \sum_{i,j} |org_{i,j} - AveMB|$$

where costd, costf, costb, costbi, and costi are respectively costs for the temporal direct mode, the forward prediction mode, the backward prediction mode, the bi-directional prediction mode, and the intra-encoding mode. Furthermore, $org_{i,j}$ represents a pixel value of a pixel having a horizontal coordinate i and a vertical coordinate j contained in the input macro block, and $ref_{i,j}$ represents a pixel value of a pixel having the horizontal coordinate i and the vertical coordinate j contained in the prediction image. The prediction mode determiner 21 generates the prediction image from the reference image in accordance with the same method as that of the prediction image generator 22. Also mv1 and mv2 respectively represent motion vectors with respect to the input macro block, premv1 and premv2 respectively represent motion vectors of the just encoded macro block. Table[a,b] represents an output of an estimated code amount corresponding to a difference vector between a vector a and a vector b. For example, Table[a,b] may be a reference table listing an estimated code amount for each of a variety of vectors. Also λ is a weight constant and may be 1. AveMB is an average value of pixel values contained the input macro block.

The prediction mode determiner 21 calculates the cost of each of the prediction modes to be selected in accordance with equations (3). The prediction mode determiner 21 selects as a prediction mode applicable to the input macro block a prediction mode of a minimum cost.

The prediction mode determiner 21 may add an offset value to the cost value of a particular prediction mode calculated in accordance with equations (3) or may multiply the cost value of the particular prediction mode by a correction coefficient so that the particular prediction mode, for example, the temporal direct mode, is easy to select or hard to select.

The prediction mode determiner 21 notifies the prediction image generator 22 of the selected prediction mode.

The prediction image generator 22 generates the prediction image in accordance with the prediction mode selected by the prediction mode determiner 21. If the input macro block is to be inter-encoded through one of forward prediction mode and the backward prediction mode, the prediction image generator 22 motion-compensates for the reference image from the reference image memory 15 in accordance with the motion vector supplied by the motion vector calculator 16. The prediction image generator 22 generates the prediction image for inter-encoding on a per motion-compensated macro block basis. In the motion compensation, a position deviation, represented by the motion vector, between the macro block and a block on the reference image most similar to the macro block, is canceled by shifting in position the block on the reference image most similar to the macro block. If the input macro block is to be inter-encoded through one of the bi-directional prediction mode and the temporal direct mode, the prediction image generator 22 motion-compensates for the reference images respectively identified by the two motion vectors with the respective motion vectors. The prediction image generator 22 generates the prediction image by averaging the pixel values of the corresponding pixels on the two compensated images obtained through motion compensation. Alternatively, the prediction image generator 22 may generate the prediction image by weighted-averaging the pixel values of the corresponding pixels on the two compensated images with weighting coefficients. The weighting coefficients may be set to be larger as the lengths of the corresponding motion vectors in the temporal direction become longer. However, if the input macro block is to be inter-encoded in the temporal direct mode, the prediction image generator 22 uses the two motion vectors calculated by the direct motion vector calculator 20.

If the input macro block is to be intra-encoded, the prediction image generator 22 generates the prediction image from the macro block adjacent to the input macro block. In such a case, the prediction image generator 22 generates the prediction image in accordance with one of the horizontal mode, the DC mode, and the plain mode defined in H.264 MPEG-4 AVC. The prediction image generator 22 transfers the generated prediction image to the prediction error signal generator 11.

Figure 5:
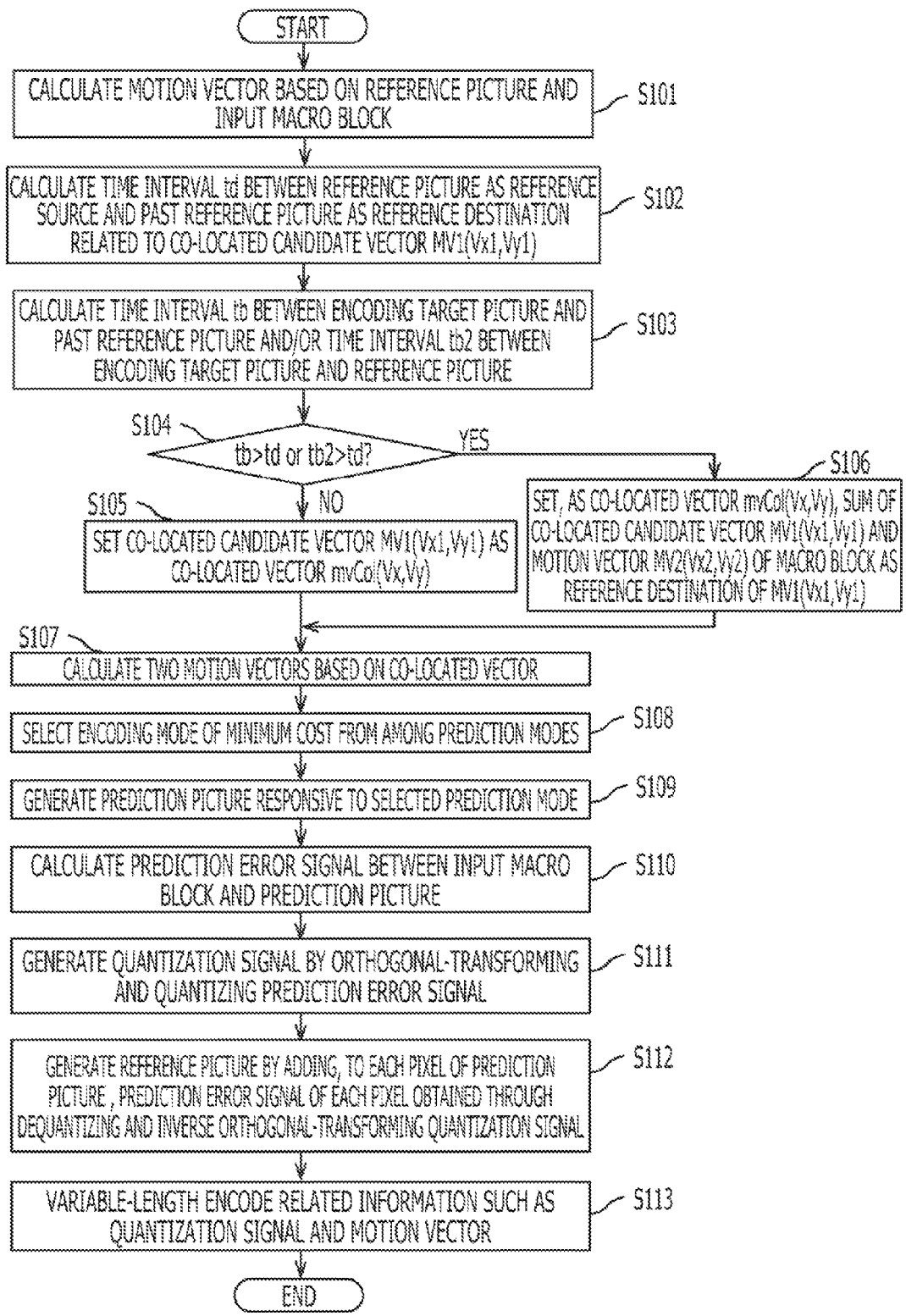
FIG. 5 is an operation flowchart of a moving picture encoding process performed on a bi-direction prediction picture.

FIG. 5 is a operation flowchart of a moving picture encoding process executed by the moving picture encoding apparatus 1 on the bi-directional prediction picture. The moving picture encoding apparatus 1 performs a moving picture encoding process of FIG. 5 on each of the macro blocks included in the bi-directional prediction picture. The motion vector calculator 16 reads from the reference image memory 15 a reference image that may be referred to by the input macro block. The motion vector calculator 16 then calculates the motion vector based on the reference image and the input macro block (operation S101). The motion vector calculator 16 stores on the motion vector memory 17 the calculated motion vector together with a picture number of the encoding target picture included in the input macro block serving as the reference source of the motion vector, and a picture number of a picture serving as the reference destination. The motion vector calculator 16 transfers the calculated motion vector to the prediction mode determiner 21.

The picture interval comparator 18 reads from the motion vector memory 17 the motion vector having as the reference source the macro block at the position corresponding to the input macro block, on the reference picture encoded immediately prior to the encoding target picture including the input macro block. The picture interval comparator 18 sets the motion vector to be the standard candidate vector MV1(Vx1, Vy1). The picture interval comparator 18 calculates the time interval td between the reference picture as the reference source of the standard candidate vector MV1(Vx1,Vy1) and the past reference picture as the reference destination (operation S102). The picture interval comparator 18 calculates the time interval tb between the encoding target picture and the past reference picture and/or the time interval tb2 between the encoding target picture and the reference picture (operation S103). The picture interval comparator 18 determines whether the time interval tb or tb2 is longer than the time interval td (operation S104). The picture interval comparator 18 then notifies the co-located vector decider 19 of the determination results as to whether the time interval tb or tb2 is longer than the time interval td.

If the time interval tb or tb2 is shorter than the time interval td (no from operation S104), the co-located vector decider 19 sets the standard candidate vector MV1(Vx1,Vy1) to be the co-located vector mvCol(Vx,Vy) (operation S105). If one of the time intervals tb and tb2 is determined and if the determined time interval tb or tb2 is shorter than the time interval td, the co-located vector decider 19 sets the standard candidate vector to be the co-located vector. On the other hand, if the time interval tb or tb2 is longer than the time interval td (yes from operation S104), the co-located vector decider 19 reads from the motion vector memory 17 the motion vector MV2(Vx2,Vy2) having as a reference source the macro block as the reference destination of the standard candidate vector MV1(Vx1,Vy1). The co-located vector decider 19 sets the sum of the standard candidate vector MV1(Vx1,Vy1) and the motion vector MV2(Vx2,Vy2) to be the co-located vector mvCol(Vx,Vy) (operation S106).

Subsequent to operation S105 or S106, the co-located vector decider 19 transfers to the direct motion vector calculator 20 the determined co-located vector, and the picture numbers of the pictures as the reference destination and the reference source of the co-located vector.

The direct motion vector calculator 20 calculates the time interval td between the pictures as the reference destination and the reference source of the co-located vector and the time interval tb between the encoding target picture and the picture as the reference destination of the co-located vector. By substituting the co-located vector and the ratio tb/td of the time intervals tb and td for those in equations (1), the direct motion vector calculator 20 calculates the two motion vectors mvL0 and mvL1 (operation S107). The direct motion vector calculator 20 transfers the two determined motion vectors mvL0 and mvL1 to the prediction mode determiner 21.

The prediction mode determiner 21 calculates costs representing evaluation values of code amounts of the input macro blocks in each of the intra-encoding mode, the forward prediction mode, the backward prediction mode, the bi-directional prediction mode, and the temporal direct mode. The prediction mode determiner 21 selects as a prediction mode applicable to the input macro block a prediction mode of a minimum cost (operation S108).

The prediction mode determiner 21 notifies the prediction image generator 22 of the selected prediction mode.

The prediction image generator 22 generates the prediction image responsive to the selected prediction mode based on the reference image read from the reference image memory 15 (operation S109). The prediction image generator 22 transfers the generated prediction image to the prediction error signal generator 11 in the encoder 10. The prediction error signal generator 11 calculates a prediction error signal between the input macro block and the prediction image generated by the co-located vector decider 19 (operation S110). The orthogonal transformer and quantizer 12 in the encoder 10 orthogonal-transforms and quantizes the prediction error signal calculated by the prediction error signal generator 11, thereby generating a quantization signal (operation S111). The orthogonal transformer and quantizer 12 transfers the quantization signal to each of the decoder 14 and the variable-length encoder 13 in the encoder 10.

The decoder 14 reproduces the macro block by adding to each pixel of the prediction image the prediction error signal of each pixel in the macro block obtained through dequantizing and inverse orthogonal-transforming the quantization signal (operation S112). The decoder 14 reproduces a picture by coupling the obtained macro blocks in a specific order and then stores the picture as a reference image on the reference image memory 15.

The variable-length encoder 13 in the encoder 10 variable-length encodes related information such as the quantization signal and the motion vector (operation S113). The variable-length encoder 13 outputs the variable-length encoded data.

The moving picture encoding apparatus 1 thus ends the moving picture encoding process for one macro block.

The order of operations S101 and operations S102-S107 may be reversed. Operations S101-S108 may be skipped for the macro block included in the I picture. In operation S109, the prediction image generator 22 generates the prediction image for intra-encoding. Operations S102-S107 are skipped for the macro block included in the P picture. In operation S108, the prediction mode determiner 21 calculates the cost of each of the intra-encoding mode, the forward prediction mode, the backward prediction mode. The prediction mode determiner 21 thus selects as the prediction mode applicable to the input macro block the prediction mode of a minimum cost. Operations S101-S110 are skipped for the macro block undergoing neither inter-encoding nor intra-encoding. In operation S111, the orthogonal transformer and quantizer 12 orthogonal-transforms the input macro block.

As described above, the moving picture encoding apparatus 1 sets the co-located vector on the macro block, to which the temporal direct mode is applied, such that the time interval between the pictures as the reference destination and the reference source of the co-located vector is longer. More specifically, the moving picture encoding apparatus 1 sets the co-located vector such that the time interval between the pictures as the reference destination and the reference source of the co-located vector is longer than the time interval between the encoding target picture including the macro block and the picture as the reference destination or the reference source of the co-located vector. The moving picture encoding apparatus 1 thus prevents a motion prediction error contained in the co-located vector from increasing in the motion vector calculated from the co-located vector. The moving picture encoding apparatus 1 increases the prediction accuracy to the motion of the image in the macro block of the co-located vector in the temporal direct mode. As a result, the moving picture encoding apparatus 1 not only increases the macro blocks to which the temporal direct mode is applied, but also increases the encoding efficiency of the moving picture data.

A plurality of subblocks may be defined in a single macro block. A macro block of 16 pixels in the vertical direction by 16 pixels in the horizontal direction may include four subblocks, each subblock of 8 rows by 8 columns of pixels, or sixteen subblocks, each subblock of 4 rows by 4 columns of pixels. Alternatively, the macro block of 16 pixels in the vertical direction by 16 pixels in the horizontal direction may include two subblocks, each subblock of 8 rows by 16 columns of pixels, or two subblocks, each subblock of 16 rows by 8 columns of pixels. Alternatively, one macro block may include a plurality of subblocks different in size. If the reference block is split into a plurality of subblocks, the co-located vector decider 19 may decide the co-located vector on a per subblock basis on the one macro block. If a single reference block includes four subblocks, the co-located vector decider 19 decides four co-located vectors for the one macro block of interest on the encoding target picture. The direct motion vector calculator 20 generates the motion vector for each co-located vector of each subblock in accordance with equations (1).

The motion vector may designate a travel distance in space by a unit smaller than the size of the macro block. A shift block into which the reference block on the reference picture has been shifted in accordance with the motion vector MV1 (Vx1,Vy1) of the reference block may not fully match any macro block on the past reference picture. The co-located vector decider 19 thus adds to a center position (RefCx1, RefCy1) of the reference block the motion vector MV1 of the reference block, thereby resulting in a shift center position (RefCx1+Vx1,RefCy1+Vy1). The co-located vector decider 19 then decides, as a response block, a macro block containing the shift center position (RefCx1+Vx1,RefCy1+Vy1) on the past reference picture. The co-located vector decider 19 sets the motion vector determined for the response block as the motion vector MV2(Vx2,Vy2) for determining the co-located vector. If the reference block is split into a plurality of subblocks as described above, the co-located vector decider 19 decides a response block on the past reference picture for each subblock included in the reference block. More specifically, the co-located vector decider 19 decides as a response subblock a subblock on the past reference picture including the position resulting from adding the motion vector of the subblock to the center position of the subblock. The co-located vector decider 19 sets the motion vector determined for the response subblock to be the motion vector MV2(Vx2, Vy2) for determining the co-located vector.

From among the macro blocks on the past reference picture, a macro block may at least partially overlap the shift block. The co-located vector decider 19 may determine the motion vector MV2(Vx2,Vy2) by weighted-averaging the overlapping macro blocks with an area of an overlapping region.

Similarly, if the reference block is split into a plurality of subblocks, the co-located vector decider 19 may determine a shift block into which a subblock of interest included in the reference block has been shifted in accordance with the motion vector of that subblock. The co-located vector decider 19 then weighted-averages the motion vectors of subblocks, from among the subblocks on the past reference picture, partially at least overlapping on shift subblock, with the area of overlapping regions. The co-located vector decider 19 sets the weight-averaged motion vector to be the motion vector MV2(Vx2,Vy2) of the subblock of interest.

Figure 6:
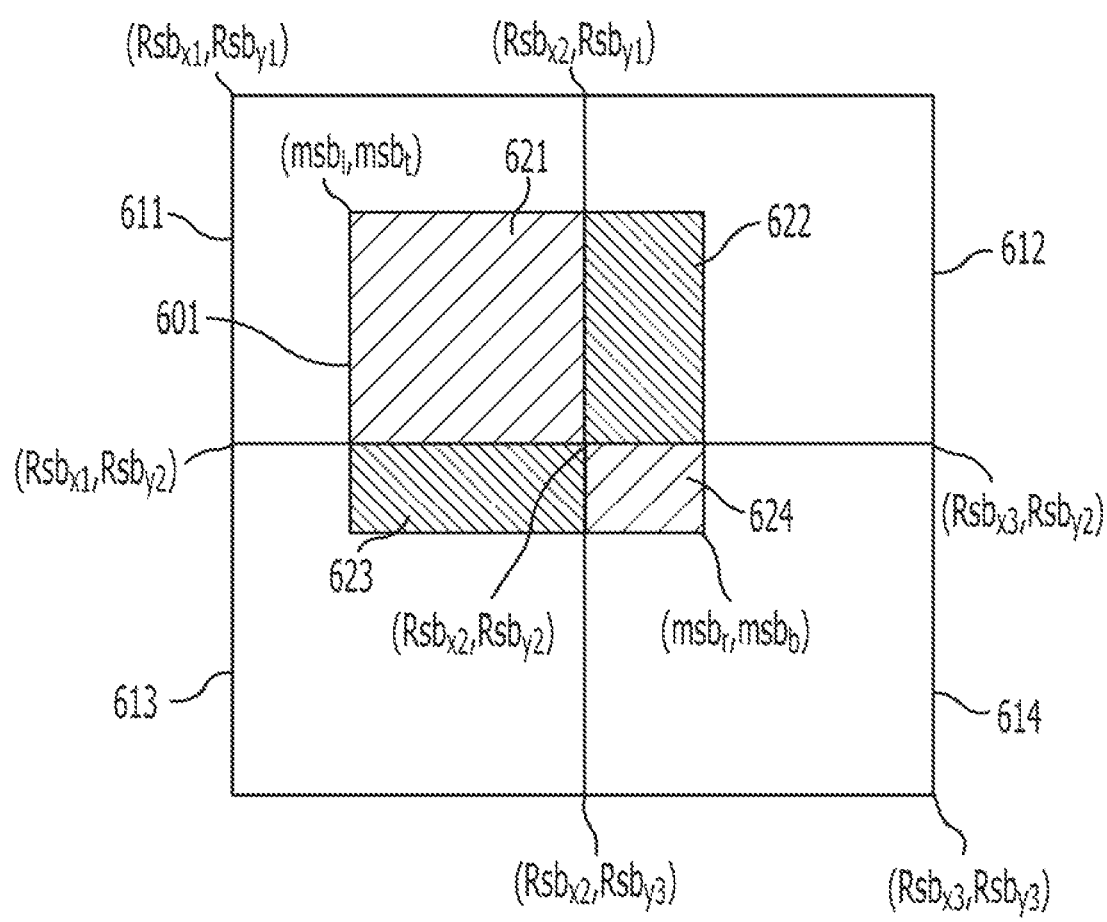
FIG. 6 illustrates an example of a correspondence relationship between a shift subblock and a plurality of subblocks of a past reference picture wherein the shift subblock is the one into which a subblock within a reference block is shifted in accordance with a standard candidate vector.

FIG. 6 illustrates an example of correspondence relationship between the shift subblock into which the subblock in the reference block has been shifted in accordance with the standard candidate vector, and a plurality of subblocks on the past reference picture.

Referring to FIG. 6, a shift subblock 601 overlaps subblocks 611-614 of a past reference picture. The upper left corner of the shift subblock 601 has coordinates (msbl,msbt), and the lower right corner of the shift subblock 601 has coordinates (msbr,msbb). If the upper left corner and the lower right corner of a subblock of interest on the reference picture serving as a shift origin of the shift subblock 601 have coordinates (sbl,sbt) and (sbr,sbb), respectively, and the motion vector of the subblock of interest is MV1(Vx1,Vy1), the coordinates have the following relationship:

$$(msbl,msbt)=(sbl+Vx1,sbt+Vy1)$$

$$(msbr,msbb)=(sbr+Vx1,sbb+Vy1)$$

The upper left corner and the lower right corner of the subblock 611 on the past reference picture have coordinates (Rsbx1,Rsby1) and (Rsbx2,Rsby2), respectively. Similarly, the upper left corner and the lower right corner of the subblock 612 on the past reference picture has coordinates (Rsbx2,Rsby1) and (Rsbx3,Rsby2), respectively. The upper left corner and the lower right corner of the subblock 613 on the past reference picture has coordinates (Rsbx1,Rsby2) and (Rsbx2,Rsby3), respectively. The upper left corner and the lower right corner of the subblock 614 on the past reference picture has coordinates (Rsbx2,Rsby2) and (Rsbx3,Rsby3), respectively.

In this case, areas S1-S4 of regions 621-624 where the shift subblock 601 overlaps the subblocks 611-614 are described as follows:

$$S1=(Rsbx2-msbl)*(Rsby2-msbt)$$

$$S2=(smbr-Rsbx2)*(Rsby2-msbt)$$

$$S3=(Rsbx2-msbl)*(msbb-Rsby2)$$

$$S4=(msbr-Rsbx2)*(msbb-Rsby2)$$

If motion vectors of the subblocks 611-614 are respectively MVs1(Vxs1,Vys1)-MVs4(Vxs4,Vys4), a horizontal travel amount Vx2 and a vertical travel amount Vy2 of the motion vector the motion vector MV2(Vx2,Vy2) for determining the co-located vector of the subblock of interest are determined as follows:

$$Vx2=(S1*Vxs1+S2*Vxs2+S3*Vxs3+S4*Vxs4)/(S1+S2+S3+S4)$$

$$Vy2=(S1*Vys1+S2*Vys2+S3*Vys3+S4*Vys4)/(S1+S2+S3+S4)$$

If the time interval between the encoding target picture and the reference picture is longer than the time interval between the reference picture and the past reference picture, the co-located vector decider 19 may determine the co-located vector for the input macro block in another method.

In one embodiment, the co-located vector decider 19 may determine the co-located vector based on the motion vector MV2(Vx2,Vy2) of the macro block on the past reference picture serving as the reference destination of the standard candidate vector MV1(Vx1,Vy1) of the reference block on the reference picture. For example, the co-located vector decider 19 calculates the co-located vector mvCol(Vx,Vy) in accordance with equation (4):

$$mvCol(Vx,Vy)=MV2(Vx2,Vy2)*td/ta \qquad (4)$$

where ta represents a time interval between the reference destination of the motion vector MV2(Vx2,Vy2) and the past reference picture, and td represents a time interval between the reference picture and the picture of the reference destination of the motion vector MV2(Vx2,Vy2).

Figure 7:
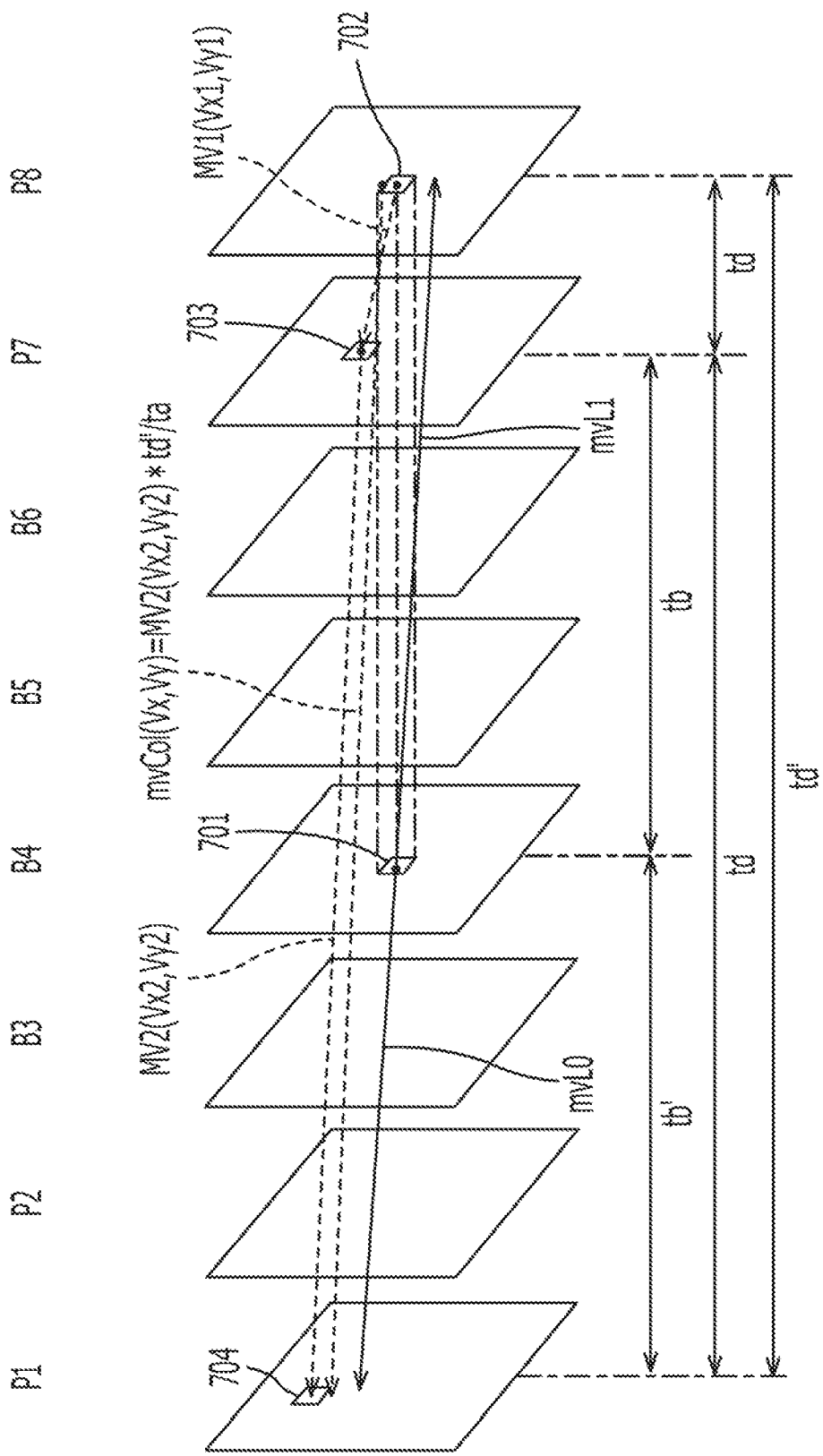
FIG. 7 illustrates the co-located vector and the motion vectors in another embodiment when the time interval between the encoding target picture and the reference picture is longer than the time interval between the reference picture and the past reference picture in the temporal direct mode.

FIG. 7 illustrates the co-located vector and the motion vectors in another embodiment when the time interval between the encoding target picture and the reference picture is longer than the time interval between the reference picture and the past reference picture in the temporal direct mode. Referring to FIG. 7, pictures P1-P8 respectively represent fields. The picture types and the encoding order of pictures P1-P8 illustrated in FIG. 7 are respectively identical to the picture types and the encoding order of pictures P1-P8 illustrated in FIG. 2.

Referring to FIG. 7, picture B4 as a B picture is an encoding target picture and block 701 on picture B4 is a block of interest. The encoding of pictures P1, P2, P7, and P8 is complete.

Referring to FIG. 7, the reference picture is picture P8 encoded immediately prior to picture B4 and having the same parity as that of picture B4. Block 702 on the reference picture at the same position as block 701 of interest is a reference block. The co-located vector decider 19 refers to the motion vector MV1(Vx1,Vy1) of the reference block 702 to determine the co-located vector of block 701. The motion vector MV1(Vx1,Vy1) refers to block 703 on picture P7 included in the same frame as that of picture P8. Picture P7 becomes a past reference picture. Vx1 and Vy1 respectively represent position differences in the horizontal direction and in the vertical direction between block 703 and block 702.

The time interval tb between the encoding target picture B4 and the past reference picture P7 is longer than the time interval td between the reference picture P8 and the past reference picture P7. The co-located vector decider 19 thus reads from the motion vector memory 17 the motion vector MV2(Vx2,Vy2) of block 703. The co-located vector decider 19 calculates the co-located vector mvCol(Vx,Vy) in accordance with equations (3). Time interval to is a time interval between picture P1 including block 704 as the reference destination of the motion vector MV2(Vx2,Vy2) and the past reference picture P7, and time interval td' is a time interval between picture P1 and the reference picture P8. In other words, the picture as the reference destination of the co-located vector is picture P1, and the picture as the reference source of the co-located vector is P8. Vx2 and Vy2 respectively represent position differences in the horizontal direction and in the vertical direction between block 704 and block 703.

If the co-located vector is calculated in this way, the time interval td between the reference picture P8 as the reference source of the co-located vector and picture P1 as the reference destination is longer than the time interval tb between the encoding target picture B4 and picture P1 as the reference destination of the co-located vector. If an image on block 701 and images on blocks 702 and 704 move at the same rate in the same direction, the motion vector calculated from the co-located vector mvCol(Vx,Vy) has a high motion prediction accuracy. According to the embodiment, the two motion vectors mvL0 and mvL1 of block 701 are calculated in accordance with equations (1). The motion vector mvL0 refers to picture P1, and the motion vector mvL1 refers to picture P8.

If pictures included in the moving picture data to be encoded are fields, it is likely that, of the two pictures of different parities included in the same frame, images in corresponding macro blocks at the same regions of the frame are similar to each other. If the past reference picture and the reference picture are included in the same frame, the co-located vector decider 19 identifies a macro block on the past reference picture at the same position as the position of the reference block. The co-located vector decider 19 may set the identified macro block to be the motion vector MV2(Vx2, Vy2) used to determine the co-located vector.

Any B picture included in the moving picture data as an encoding target may be a picture that is referred to in order to inter-encode a P picture or an B picture. If, in such a case, the pictures included in the moving picture data as an encoding target are frames, there are times when the time interval tb between the encoding target picture and the past reference picture is longer than the time interval td between the past reference picture and the reference picture.

Figure 8:
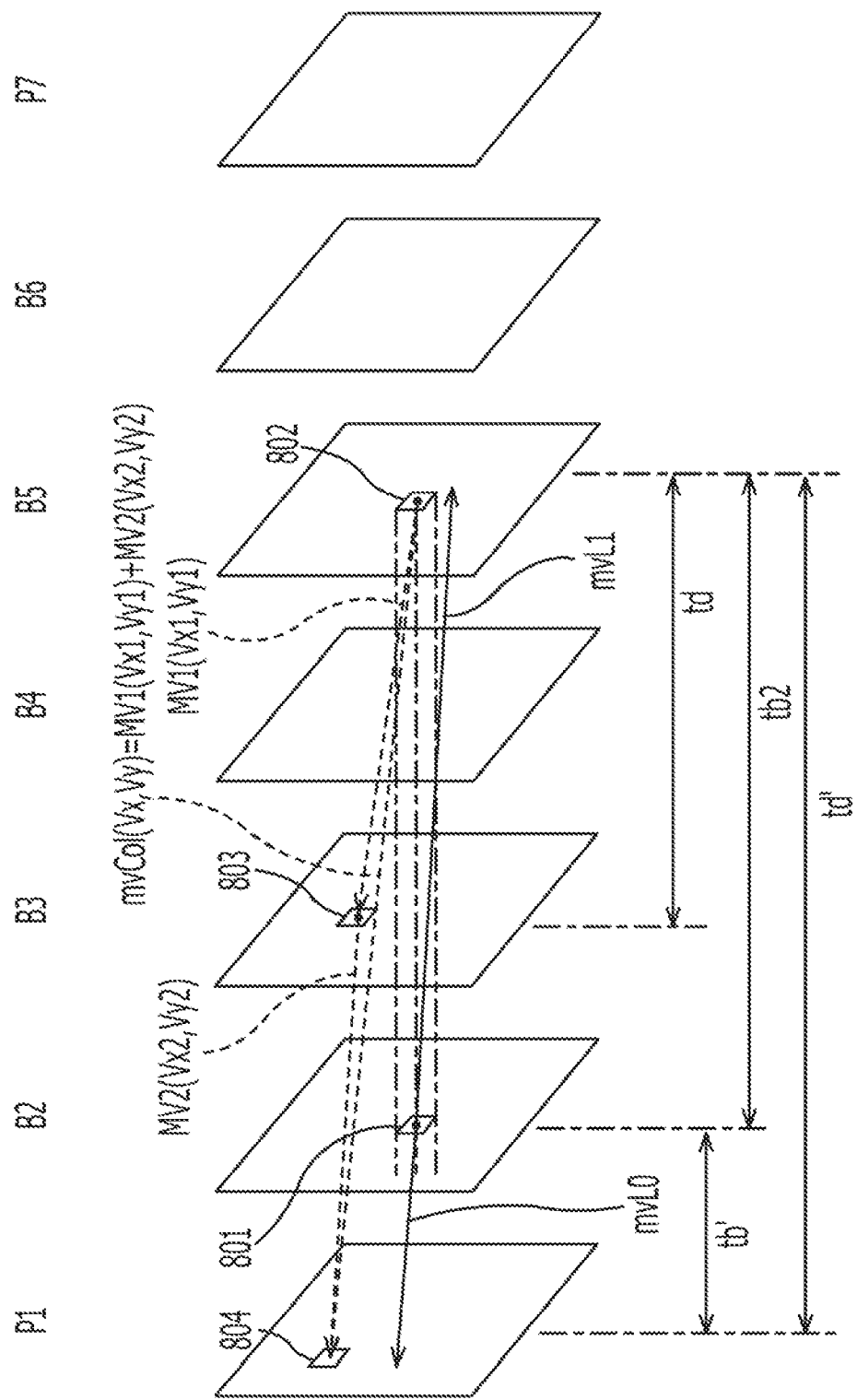
FIG. 8 illustrates the co-located vector and the motion vectors in yet another embodiment when the time interval between the encoding target picture and the reference picture is longer than the time interval between the reference picture and the past reference picture in the temporal direct mode.

FIG. 8 illustrates the co-located vector and the motion vectors in yet another embodiment when the time interval between the encoding target picture and the reference picture is longer than the time interval between the reference picture and the past reference picture in the temporal direct mode.

Referring to FIG. 8, pictures P1, and P7 are P pictures while pictures B2-B6 are B pictures. Pictures B3 and B5 may be referred to by another B picture. The pictures P1, P7, B3, B5, B2, B4 and B6 are to be encoded in that order. Picture B2 as a B picture is an encoding target picture, and block 801 is a block of interest. The encoding of pictures P1, B3, B5, and P7 is complete at this point of time.

Referring to FIG. 8, the reference picture is picture P5 that is encoded immediately prior to picture B2. Block 802 on the reference picture at the same position as the position of block 801 of interest is a reference block. The motion vector MV1(Vx1,Vy1) of the reference block 802 is referred to in order to determine the co-located vector to block 801. The motion vector MV1(Vx1,Vy1) refers to block 803 on picture B3 that is later in time than picture B2. Picture B3 becomes a past reference picture. Vx1 and Vy1 respectively represent position differences in the horizontal direction and in the vertical direction between block 803 and block 802. Since picture B5 is a B picture, there is a possibility that two motion vectors are defined to block 802. In such a case, a motion vector indicated by List0 defined in H.264 MPEG-4 AVC standard is used with higher priority as the motion vector MV1(Vx1,Vy1) for determining the co-located vector. If the results of the prediction mode determination show that no motion vector indicated by List0 is present, a motion vector indicated by List1 is used as the motion vector MV1(Vx1,Vy1).

If both the reference picture B5 and the past reference picture B3 are later in time than the encoding target picture B2, the time interval tb between the encoding target picture B2 and the reference picture B5 is longer than the time interval td between the past reference picture B3 and the reference picture B5.

The picture interval comparator 18 may thus notify the co-located vector decider 19 of the determination results indicating that tb2 is longer than td if both the reference picture and the past reference picture are later in time than the encoding target picture. The picture interval comparator 18 may further notify the co-located vector decider 19 of the determination results indicating that tb is longer than td if both the reference picture and the past reference picture are earlier in time than the encoding target picture. In such a case, as well, the co-located vector decider 19 determines the co-located vector mvCol(Vx,Vy) in accordance with equation (2) or (4).

Figure 9:
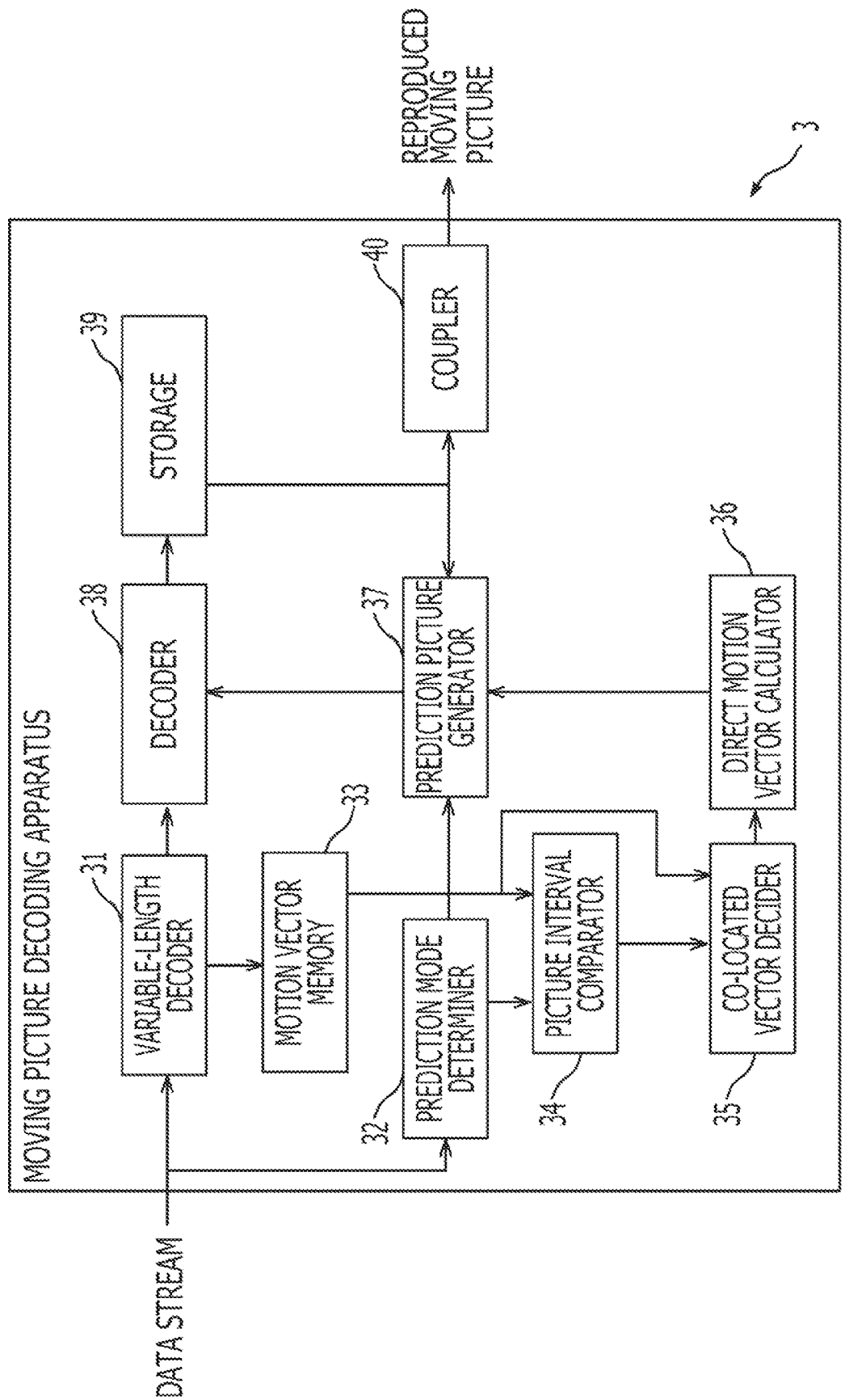
FIG. 9 illustrates a general configuration of a moving picture decoding apparatus that decodes the moving picture data encoded by the moving picture encoding apparatus of any of the embodiments.

FIG. 9 illustrates a general configuration of a moving picture decoding apparatus 3 decoding the moving picture data encoded by the moving picture encoding apparatus 1 of each of the above embodiments. The moving picture decoding apparatus 3 includes variable-length decoder 31, prediction mode determiner 32, motion vector memory 33, picture interval comparator 34, co-located vector decider 35, direct motion vector calculator 36, prediction image generator 37, decoder 38, storage 39, and coupler 40.

Theses elements of the moving picture decoding apparatus 3 may be arranged as respective separate circuits. Alternatively, these elements may be arranged as a single integrated circuit into the moving picture decoding apparatus 3. Furthermore, these elements of the moving picture decoding apparatus 3 may be a functional module that is executed by a computer program running on a processor in the moving picture decoding apparatus 3.

The moving picture decoding apparatus 3 acquires a data stream including encoded moving picture data via a communication network and an interface circuit connecting the moving picture decoding apparatus 3 to the communication network. The moving picture decoding apparatus 3 causes the data stream to be stored on a buffer memory (not illustrated). The moving picture decoding apparatus 3 reads from the buffer memory the encoded moving picture data on a per encoded macro block unit basis, and inputs the data to the variable-length decoder 31 on a per encoded macro unit basis.

The variable-length decoder 31 variable-length decodes the data encoded on a per macro unit basis. The variable-length decoder 31 reproduces a quantization image that is a quantized prediction error signal. If a macro block of interest is a macro block that is inter-encoded in accordance with an inter-encoding mode other than the temporal direct mode, the variable-length decoder 31 variable-length decodes the motion vector of the macro block. The variable-length decoder 31 then transfers the reproduced motion vector to each of the prediction image generator 37 and the motion vector memory 33. The variable-length decoder 31 transfers the quantization signal to the decoder 38.

The prediction mode determiner 32 identifies from header information included in the encoded moving picture data a prediction mode applied to the macro block of interest of a decoding target picture. If the applied prediction mode is the temporal direct mode, the prediction mode determiner 32 causes the picture interval comparator 34, the co-located vector decider 35, and the direct motion vector calculator 36 to determine the motion vector for the temporal direct mode.

The prediction mode determiner 32 notifies the prediction image generator 37 of the prediction mode applied to the macro block of interest.

The motion vector memory 33 is identical in function to the motion vector memory 17 in the moving picture encoding apparatus 1. The picture interval comparator 34, the co-located vector decider 35, and the direct motion vector calculator 36 are also identical in function to the picture interval comparator 18, the co-located vector decider 19, and the direct motion vector calculator 20 in the moving picture encoding apparatus 1, respectively.

More specifically, the motion vector memory 33 stores reproduced motion vectors of a plurality of pictures that are likely to be used in the determination of the co-located vector in the temporal direct mode. The picture interval comparator 34 reads from the motion vector memory 33 the macro block of interest on the decoding target picture and the motion vector having as a reference source a reference block at the corresponding position on the reference picture decoded immediately prior to the decoding target picture. The picture interval comparator 34 sets the motion vector as a standard candidate vector. The picture interval comparator 34 sets as a past reference picture a picture including a macro block as the reference destination of the standard candidate vector. The picture interval comparator 34 determines whether a time interval between the decoding target picture and the reference picture or the past reference picture is longer than a time interval between the reference picture and the past reference picture. The detail of the determination method has already been described in connection with the picture interval comparator 18 in the moving picture encoding apparatus 1. The picture interval comparator 34 notifies the co-located vector decider 35 of the determination results. The reference block may be a macro block on the reference picture at the same position as the position of the macro block of interest. Alternatively, the reference block may be a block on the reference picture having the macro block of interest that is present in the extension line of the standard candidate vector.

If the time interval between the decoding target picture and the reference picture or the past reference picture is shorter than the time interval between the reference picture and the past reference picture, the co-located vector decider 35 decides the standard candidate vector as the co-located vector. If the time interval between the decoding target picture and the reference picture or the past reference picture is longer than the time interval between the reference picture and the past reference picture, the co-located vector decider 35 reads from the motion vector memory 33 the motion vector $MV2(Vx2,Vy2)$ having as a reference source the macro block as the reference destination of the standard candidate vector. Based on the motion vector $MV2(Vx2,Vy2)$, the co-located vector decider 35 decides the co-located vector in accordance with equation (2) or (4). The co-located vector decider 35 transfers the co-located vector to the direct motion vector calculator 36.

The direct motion vector calculator 36 calculates two motion vectors in accordance with the co-located vector and equations (1). The direct motion vector calculator 36 transfers the two calculated motion vectors to the prediction image generator 37.

The prediction image generator 37 is identical in function to the prediction image generator 22 in the moving picture encoding apparatus 1. The prediction image generator 37 generates a prediction image of the macro block of interest on the decoding target picture in accordance with the applied prediction mode.

The prediction image generator 37 reads from the storage 39 the reference image used to encode the macro block of interest. If the applied prediction mode is an inter-encoding mode such as the forward prediction mode or the backward prediction mode, the prediction image generator 37 generates the prediction image by motion-compensating for the reference image in accordance with the motion vector. If the prediction mode is the temporal direct mode, the prediction image generator 37 performs motion prediction using the two motion vectors calculated by the direct motion vector calculator 36. If the applied prediction mode is an intra-encoding mode, the prediction image generator 37 generates the prediction image from the reference image in accordance with an applied prediction image generation mode of the intra-encoding modes. The prediction image generator 37 transfers the generated prediction image to the decoder 38.

The decoder 38 dequantizes the quantization signal received from the variable-length decoder 31 by multiplying the quantization signal by a specific value. The specific value corresponds to the quantization width determined by the quantization parameter acquired from the header information included in the encoded moving picture data. Through the dequantization process, a frequency signal of the macro block of interest, such as a set of DCT coefficients, is restored. The decoder 38 then inverse orthogonal-transforms the frequency signal. The prediction error signal is thus reproduced by performing the dequantization process and the inverse orthogonal process on the quantization signal.

On an inter-encoded picture, the decoder 38 adds, to a pixel value of each pixel in the motion-compensated prediction image, a reproduced prediction error signal of the corresponding pixel. On an intra-encoded picture, the decoder 38 adds, to a pixel value of each pixel in the prediction image generated based on the previously encoded macro block, a reproduced prediction error signal of the corresponding pixel. By executing these operations on the macro block of interest, the decoder 38 reproduces the macro block of interest. The decoder 38 couples the reproduced macro blocks in the encoding order, thereby reproducing the picture. The decoder 38 causes the storage 39 to store the reproduced picture.

The storage 39 includes a frame memory. The storage 39 temporarily stores a picture received from the decoder 38. The storage 39 then supplies the picture to the prediction image generator 37 as a reference image. The storage 39 also outputs the picture to the coupler 40. The storage 39 stores a specific number of pictures. If an amount of data stored on the storage 39 exceeds the specific number of pictures, the storage 39 deletes the pictures in the encoding order from old to new.

The coupler 40 re-organizes the reproduced pictures in a time-series order, thereby reproducing the moving picture data. The coupler 40 outputs the reproduced moving picture data. The output moving picture data may be stored on a storage device (not illustrated). Alternatively, the output moving picture data may be displayed on a display device (not illustrated) connected to the moving picture decoding apparatus 3.

Figure 10:
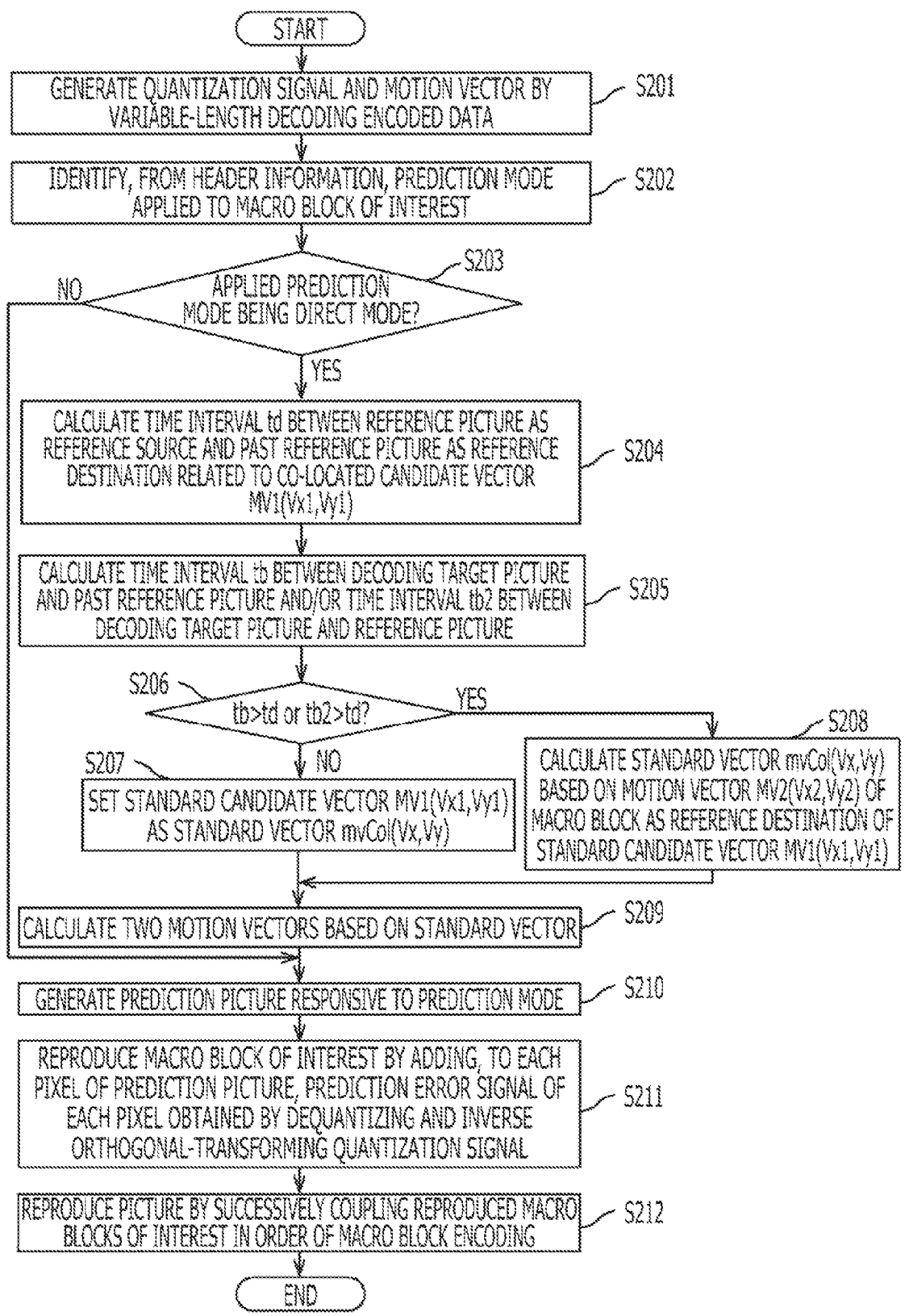
FIG. 10 is an operation flowchart of the moving picture decoding apparatus.

FIG. 10 is an operation flowchart of a moving picture decoding process executed by the moving picture decoding apparatus 3. The moving picture decoding apparatus 3 executes the moving picture decoding process on a per macro block basis.

The variable-length decoder 31 reproduces the quantized prediction error signal and motion vector by variable-length decoding the data encoded on a per macro block unit basis (operation S201). The variable-length decoder 31 transfers the reproduced motion vector to each of the prediction image generator 37 and the motion vector memory 33. The variable-length decoder 31 also transfers the quantized prediction error signal to the decoder 38. The prediction mode determiner 32 identifies, from header information included in the encoded moving picture data, a prediction mode applied to the macro block of interest on the decoding target picture (operation S202). The prediction mode determiner 32 notifies the prediction image generator 37 of the prediction mode applied to the macro block of interest.

The prediction mode determiner 32 determines whether the applied prediction mode is the temporal direct mode (operation S203). If the applied prediction mode is the temporal direct mode (yes from operation S203), the prediction mode determiner 32 causes the picture interval comparator 34, the co-located vector decider 35, and the direct motion vector calculator 36 to determine the motion vector for the temporal direct mode.

The picture interval comparator 34 reads from the motion vector memory 39 the motion vector having as the reference source the reference block at the position on the reference picture corresponding to the macro block of interest. The picture interval comparator 34 sets the motion vector to be the standard candidate vector MV1(Vx1,Vy1). The picture interval comparator 34 calculates the time interval td between the reference picture as the reference source of the standard candidate vector MV1(Vx1,Vy1) and the past reference picture as the reference destination of the standard candidate vector MV1(Vx1,Vy1) (operation S204). The picture interval comparator 34 calculates the time interval tb between the decoding target picture including the macro block of interest and the past reference picture and/or the time interval tb2 between the decoding target picture and the reference picture (operation S205). The picture interval comparator 34 determines whether the time interval tb or tb2 is longer than the time interval td (operation S206). The picture interval comparator 34 then notifies the co-located vector decider 35 of the determination results as to whether the time interval tb or tb2 is longer than the time interval td.

If the time interval tb or tb2 is shorter than the time interval td (no from operation S206), the co-located vector decider 35 sets the standard candidate vector MV1(Vx1,Vy1) to be the co-located vector mvCol(Vx,Vy) (operation S207). If the determined time interval tb or tb2 is longer than the time interval td (yes from operation S206), the co-located vector decider 35 calculates the co-located vector mvCol(Vx,Vy) in accordance with the motion vector MV2(Vx2,Vy2) of the macro block as the reference destination of the standard candidate vector MV1(Vx1,Vy1) (operation S208). More specifically, the co-located vector decider 35 calculates the co-located vector mvCol(Vx,Vy) in accordance with equation (2) or (4). A shift block obtained from motion-compensating for the reference block using the standard candidate vector MV1(Vx1,Vy1) may fail to match any of the macro blocks on the past reference picture. In such a case, the co-located vector decider 35 sets as the motion vector MV2(Vx2,Vy2) a motion vector of the macro block including the center position of the shift block, from among a plurality of macro blocks on the past reference picture. From among the macro blocks on the past reference picture, a macro block may at least partially overlap the shift block. The co-located vector decider 35 may determine the motion vector MV2(Vx2,Vy2) by weighted-averaging the overlapping macro blocks with an area of overlapping regions.

If the reference block is split into a plurality of subblocks, the co-located vector decider 35 may determine the co-located vector on a per subblock basis. Subsequent to operation S207 or S208, the co-located vector decider 35 transfers to the direct motion vector calculator 36 the determined co-located vector, and the picture numbers of the pictures as the reference destination and the reference source of the co-located vector.

The direct motion vector calculator 36 calculates the time interval td between the pictures as the reference destination and the reference source of the co-located vector and the time interval tb between the decoding target picture and the picture as the reference destination of the co-located vector. By substituting the co-located vector and the ratio tb/td of the time intervals tb and td for those in equations (1), the direct motion vector calculator 36 calculates the two motion vectors mvL0 and mvL1 (operation S209). The direct motion vector calculator 36 transfers the two determined motion vectors mvL0 and mvL1 to the prediction image generator 37.

Subsequent to operation S209, or if the applied prediction mode is not the temporal direct mode (no from operation S203), the prediction image generator 37 reads from the storage 39 an already decoded picture as the reference image. In response to the reference image, the prediction image generator 37 generates the prediction image of the macro block of interest in accordance with the applied prediction mode (operation S210). The prediction image generator 37 transfers the generated prediction image to the decoder 38.

The decoder 38 reproduces the macro block of interest by adding to each pixel of the prediction image a prediction error signal of the image obtained by dequantizing and inverse orthogonal-transforming the quantization signal (operation S211). The decoder 38 reproduces a picture by successively coupling the reproduced macro blocks of interest in accordance with the encoding order of the macro blocks (operation S212). The decoder 38 stores the reproduced picture on the storage 39. The coupler 40 then rearranges the reproduced pictures in a time-series order and then outputs the arranged pictures.

The moving picture decoding apparatus 3 ends the moving picture decoding process.

A computer program for causing a processor to perform the function of each element of the moving picture encoding apparatus 1 may be stored in a computer-readable medium and the medium having the computer program stored thereon may be supplied. Similarly, a computer program for causing a processor to perform the function of each element of the moving picture decoding apparatus 3 may be stored in a computer-readable medium and the medium having the computer program stored thereon may be supplied.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. A device for encoding a picture included in moving picture data, through motion compensation, the device comprising:
    a storage unit for storing a motion vector for motion compensation, the motion vector determined for each of a plurality of encoded pictures included in the moving picture data;
    a picture interval comparator for reading from the storage unit a first motion vector as a standard candidate vector, the first motion vector having a first reference block as a reference source, the first reference block being present at a position corresponding to a first block of a plurality of blocks, the plurality of blocks split from an encoding target picture included in the moving picture data, on a first reference picture of the encoded pictures included in the moving picture data, and determining whether a first time interval is longer than a second time interval, the first time interval between a second reference picture including a second reference block as a reference destination of the standard candidate vector or the first reference picture and the encoding target picture and the second time interval between the first reference picture and the second reference picture;
    a co-located vector decider for calculating a co-located vector by setting the standard candidate vector to be the co-located vector of the first block, by setting the first reference picture to be a reference source picture of the co-located vector, and by setting the second reference picture to be a reference destination picture of the co-located vector if the first time interval is shorter than the second time interval, and for calculating a co-located vector by reading from the storage unit a second motion vector having the second reference block as a reference source, by setting a third reference picture including a block of a reference destination of the second motion vector to be the reference destination picture of the co-located vector and by setting the first reference picture to be the reference source picture of the co-located vector if the first time interval is longer than the second time interval;
    a direct motion vector calculator for calculating a first direct motion vector and a second direct motion vector of the first block by dividing the co-located vector in accordance with a ratio of a time interval between the reference destination picture and the reference source picture to a time interval between the reference destination picture and the encoding target picture;
    a prediction image generator for generating a first motion compensation image by motion-compensating for the reference destination picture in accordance with the first direct motion vector, generating a second motion compensation image by motion-compensating for the reference source picture in accordance with the second direct motion vector, and generating a prediction image of the first block in accordance with the first motion compensation image and the second motion compensation image; and
    an encoder for encoding an error signal representing a difference between the prediction image and a corresponding pixel on the first block.

2. The device according to claim 1, wherein the co-located vector decider calculates the co-located vector by adding the second motion vector to the standard candidate vector if the first time interval is longer than the second time interval.

3. The device according to claim 1, wherein the co-located vector decider calculates the co-located vector by multiplying the second motion vector by a ratio of the first time interval to a time interval between the third reference picture and the first reference picture if the first time interval is longer than the second time interval.

4. The device according to claim 1, wherein the time interval comparator determines that the first time interval is longer than the second time interval if the first reference picture and the second reference picture are fields included in the same frame.

5. The device according to claim 1, wherein the time interval comparator determines that the first time interval is longer than the second time interval if both the first reference picture and the second reference picture are later in time than the encoding target picture or if both the first reference picture and the second reference picture are earlier in time than the encoding target picture.

6. The device according to claim 1, wherein the co-located vector decider sets, to be the second reference block, a block on the second reference picture containing a center position of a shift block, into which the first reference block is spatially shifted in accordance with the standard candidate vector if the first time interval is longer than the second time interval.

7. The device according to claim 1, wherein if the first time interval is longer than the second time interval, the co-located vector decider calculates the second motion vector by reading from the storage unit a motion vector of each of the plurality of blocks on the second reference picture, the blocks having a region overlapping a shift block, into which the first reference block is spatially shifted in accordance with the standard candidate vector, and by weighted-averaging the read motion vectors in accordance with areas of the regions where the blocks corresponding to the motion vectors overlap the shift block.

8. A method of encoding, through motion compensation, a picture included in moving picture data, the method comprising:
    reading, from a storage unit storing a motion vector for motion compensation with the motion vector determined for each of a plurality of encoded pictures included in the moving picture data, a first motion vector as a standard candidate vector, the first motion vector having a first reference block as a reference source, the first reference block being present at a position corresponding to a first block of a plurality of blocks, the plurality of blocks split from an encoding target picture included in the moving picture data, on a first reference picture of the encoded pictures included in the moving picture data, and determining whether a first time interval is longer than a second time interval, the first time interval between a second reference picture including a second reference block as a reference destination of the standard candidate vector or the first reference picture and the encoding target picture and the second time interval between the first reference picture and the second reference picture;

calculating a co-located vector by setting the standard candidate vector to be the co-located vector of the first block, by setting the first reference picture to be a reference source picture of the co-located vector, and by setting the second reference picture to be a reference destination picture of the co-located vector if the first time interval is shorter than the second time interval;

calculating the co-located vector by reading from the storage unit a second motion vector having the second reference block as a reference source, by setting a third reference picture including a block of a reference destination of the second motion vector to be the reference destination picture of the co-located vector and by setting the first reference picture to be the reference source picture of the co-located vector if the first time interval is longer than the second time interval;

seeking a first direct motion vector and a second direct motion vector with respect to the first block by dividing the co-located vector in accordance with a ratio of a time interval between the reference destination picture and the reference source picture to a time interval between the reference destination picture and the encoding target picture;

generating a first motion compensation image by motion-compensating for the reference destination picture in accordance with the first direct motion vector, generating a second motion compensation image by motion-compensating for the reference source picture in accordance with the second direct motion vector, and generating a prediction image of the first block in accordance with the first motion compensation image and the second motion compensation image; and encoding an error signal representing a difference between the prediction image and a corresponding pixel on the first block.

9. The method according to claim 8, wherein the calculating comprises calculating the co-located vector by adding the second motion vector to the standard candidate vector if the first time interval is longer than the second time interval.

10. The method according to claim 8, wherein the calculating comprises calculating the co-located vector by multiplying the second motion vector by a ratio of the first time interval to a time interval between the third reference picture and the first reference picture if the first time interval is longer than the second time interval.

11. The method according to claim 8, wherein the determining comprises determining that the first time interval is longer than the second time interval if the first reference picture and the second reference picture are fields included in the same frame.

12. The method according to claim 8, wherein the determining comprises determining that the first time interval is longer than the second time interval if both the first reference picture and the second reference picture are later in time than the encoding target picture or if both the first reference picture and the second reference picture are earlier in time than the encoding target picture.

13. The method according to claim 8, wherein the calculating comprises setting, to be the second reference block, a block on the second reference picture containing a center position of a shift block, into which the first reference block is spatially shifted in accordance with the standard candidate vector if the first time interval is longer than the second time interval.

14. The method according to claim 8, wherein if the first time interval is longer than the second time interval, the calculating comprises calculating the second motion vector by reading from the storage unit a motion vector of each of the plurality of blocks on the second reference picture, the blocks having a region overlapping a shift block, into which the first reference block is spatially shifted in accordance with the standard candidate vector, and by weighted-averaging the read motion vectors in accordance with areas of the regions where the blocks corresponding to the motion vectors overlap the shift block.

15. A device for decoding encoded moving picture data, the device comprising:
    a storage unit for storing a motion vector for motion compensation, the motion vector determined for each of a plurality decoded pictures included in the moving picture data;
    a variable-length decoder for reproducing a quantization signal corresponding to a first block by variable-length decoding encoded data corresponding to the first block from among a plurality of blocks split from a decoding target picture included in the moving picture data;
    a picture interval comparator for reading from the storage unit a first motion vector as a standard candidate vector, the first motion vector having a first reference block as a reference source, the first reference block being present at a position corresponding to the first block, on a first reference picture of the decoded pictures, and determining whether a first time interval is longer than a second time interval, the first time interval between a second reference picture including a second reference block as a reference destination of the standard candidate vector or the first reference picture and the decoding target picture and the second time interval between the first reference picture and the second reference picture;
    a co-located vector decider for calculating a co-located vector by setting the standard candidate vector to be the co-located vector of the first block, by setting the first reference picture to be a reference source picture of the co-located vector, and by setting the second reference picture to be a reference destination picture of the co-located vector if the first time interval is shorter than the second time interval, and for calculating the co-located vector by reading from the storage unit a second motion vector having the second reference block as a reference source, by setting a third reference picture including a block of a reference destination of the second motion vector to be the reference destination picture of the co-located vector and by setting the first reference picture to be the reference source picture of the co-located vector if the first time interval is longer than the second time interval;
    a direct motion vector calculator for calculating a first direct motion vector and a second direct motion vector with respect to the first block by dividing the co-located vector in accordance with a ratio of a time interval between the reference destination picture and the reference source picture to a time interval between the reference destination picture and the decoding target picture;

a prediction image generator for generating a first motion compensation image by motion-compensating for the reference destination picture in accordance with the first direct motion vector, generating a second motion compensation image by motion-compensating for the reference source picture in accordance with the second direct motion vector, and generating a prediction image of the first block in accordance with the first motion compensation image and the second motion compensation image; and a decoder for reproducing the first block by reproducing a prediction error signal of each pixel included in the first block through dequantizing and inverse orthogonal-transforming the quantization signal of the first block, and by adding the prediction error signal of each pixel to the value of the corresponding pixel in the prediction image.

16. The device according to claim 15, wherein the co-located vector decider calculates the co-located vector by adding the second motion vector to the standard candidate vector if the first time interval is longer than the second time interval.

17. The device according to claim 15, wherein the co-located vector decider calculates the co-located vector by multiplying the second motion vector by a ratio of the first time interval to a time interval between the third reference picture and the first reference picture if the first time interval is longer than the second time interval.

18. A method for decoding encoded moving picture data, the method comprising:

storing on a storage unit a motion vector for motion compensation, the motion vector determined for each of a plurality of decoded pictures included in the moving picture data;

reproducing a quantization signal corresponding to a first block by variable-length decoding encoded data corresponding to the first block from among a plurality of blocks split from a decoding target picture included in the moving picture data;

reading from the storage unit a first motion vector as a standard candidate vector, the first motion vector having a first reference block as a reference source, the first reference block being present at a position corresponding to the first block, on a first reference picture of the decoded pictures, and determining whether a first time interval is longer than a second time interval, the first time interval between a second reference picture including a second reference block as a reference destination of the standard candidate vector or the first reference picture and the decoding target picture and the second time interval between the first reference picture and the second reference picture;

calculating a co-located vector by setting the standard candidate vector to be the co-located vector of the first block, by setting the first reference picture to be a reference source picture of the co-located vector, and by setting the second reference picture to be a reference destination picture of the co-located vector if the first time interval is shorter than the second time interval, and calculating the co-located vector by reading from the storage unit a second motion vector having the second reference block as a reference source, by setting a third reference picture including a block of a reference destination of the second motion vector to be the reference destination picture of the co-located vector and by setting the first reference picture to be the reference source picture of the co-located vector if the first time interval is longer than the second time interval;

seeking a first direct motion vector and a second direct motion vector with respect to the first block by dividing the co-located vector in accordance with a ratio of a time interval between the reference destination picture and the reference source picture to a time interval between the reference destination picture and the decoding target picture;

generating a first motion compensation image by motion-compensating for the reference destination picture in accordance with the first direct motion vector, generating a second motion compensation image by motion-compensating for the reference source picture in accordance with the second direct motion vector, and generating a prediction image of the first block in accordance with the first motion compensation image and the second motion compensation image; and reproducing the first block by reproducing a prediction error signal of each pixel included in the first block through dequantizing and inverse orthogonal-transforming the quantization signal of the first block, and by adding the prediction error signal of each pixel to the value of the corresponding pixel in the prediction image.

19. The method according to claim 18, wherein the calculating comprises calculating the co-located vector by adding the second motion vector to the standard candidate vector if the first time interval is longer than the second time interval.

20. The method according to claim 18, wherein the calculating comprises calculating the co-located vector by multiplying the second motion vector by a ratio of the first time interval to a time interval between the third reference picture and the first reference picture if the first time interval is longer than the second time interval.

* * * * *